US 011383175B2

(12) United States Patent
Bachrach

(10) Patent No.: US 11,383,175 B2
(45) Date of Patent: *Jul. 12, 2022

(54) HOME ARCADE SYSTEM

(71) Applicant: TASTEMAKERS, LLC, New York, NY (US)

(72) Inventor: Scott Bachrach, New York, NY (US)

(73) Assignee: TASTEMAKERS, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/001,542

(22) Filed: Aug. 24, 2020

(65) Prior Publication Data

US 2021/0039001 A1  Feb. 11, 2021

Related U.S. Application Data

(63) Continuation of application No. 16/222,726, filed on Dec. 17, 2018, now Pat. No. 10,751,632.

(60) Provisional application No. 62/599,438, filed on Dec. 15, 2017, provisional application No. 62/609,741, filed on Dec. 22, 2017.

(51) Int. Cl.
*A63F 13/90* (2014.01)
*A63F 13/25* (2014.01)
*A63F 13/23* (2014.01)

(52) U.S. Cl.
CPC .............. *A63F 13/90* (2014.09); *A63F 13/23* (2014.09); *A63F 13/25* (2014.09); *A63F 2300/1025* (2013.01); *A63F 2300/308* (2013.01)

(58) Field of Classification Search
USPC ........................................................ 463/29
See application file for complete search history.

(56) References Cited

U.S. PATENT DOCUMENTS

| 6,541,692 | B2* | 4/2003 | Miller | G10H 1/0058 |
| | | | | 84/649 |
| 7,063,326 | B1 | 6/2006 | Smart | |
| 8,182,334 | B2* | 5/2012 | Young | G07F 17/3209 |
| | | | | 463/25 |

(Continued)

FOREIGN PATENT DOCUMENTS

WO    2007052449 A1    5/2007

OTHER PUBLICATIONS

"Arcade Legends 3—Multigame Classic Video Arcade Game Machine" (BMI Gaming) Dec. 24, 2010 [online] retrieved from <URL: https://www.youtube.com/watch?v=j0Hz0yDXYCU> entire document, especially demonstration 0:10-0:27. (1 page).

(Continued)

*Primary Examiner* — Pierre E Elisca
(74) *Attorney, Agent, or Firm* — Volpe Koenig

(57) ABSTRACT

The present invention provides an affordable at-home toy arcade game experience. This invention brings authentic arcade game play into the home and dormitory. The invention utilizes authentic joysticks and buttons, with an LED screen. The game console is plug-n-play and provides 4 games in 1 game cabinet with one game featured in the cabinet art. The present invention is designed to be sold in a retail box through box retailer and assembled at home into the game console for use. The retail box can be configured either horizontal or vertical. The present invention is further detailed in the following pages and figures.

21 Claims, 22 Drawing Sheets

(56) References Cited

U.S. PATENT DOCUMENTS

| | | | | |
|---|---|---|---|---|
| 8,992,323 | B2* | 3/2015 | Kelly | G07F 17/3211 463/37 |
| 2002/0005109 | A1* | 1/2002 | Miller | G10H 1/0058 84/609 |
| 2004/0004112 | A1* | 1/2004 | Petruccelli | A63F 13/90 235/375 |
| 2005/0064940 | A1* | 3/2005 | Petruccelli | G07F 17/3216 463/43 |
| 2008/0102963 | A1 | 5/2008 | Flagg et al. | |
| 2011/0195774 | A1* | 8/2011 | Gerding | G07F 17/3269 463/31 |
| 2013/0217491 | A1* | 8/2013 | Hilbert | G07F 17/3209 463/31 |
| 2014/0094298 | A1* | 4/2014 | Lyons | G07F 17/322 463/31 |
| 2014/0287822 | A1* | 9/2014 | Young | G07F 17/3209 463/25 |

OTHER PUBLICATIONS

"LG Electronics 19M38D-B 19" Screen LED-Lit Monitor" (Amazon) Jul. 28, 2017 [online] retrieved from <URL: https//www.amazon.com/LG-Electronics-19M38D-B-LED-Lit-Monitor/dp/B01F3H37O0/ref=sr_1_4?keywords=used+19+inch+led+monitor&qid=15495745628sr=8-4#customerReviews> entire document, especially p. 1,2.

"Arcade Legends 3 Video Arcade Machines: Factory Direct Prices !: Worldwide Arcade Legends 3 Home Arcade Multi-Game Classic 80's Video Arcade Games Delivery From BMI Gaming" <https://web.archive.org/web/20171024143921/http://www.bmigaming.com/arcadelegends.htm> Dec. 10, 2017.

* cited by examiner

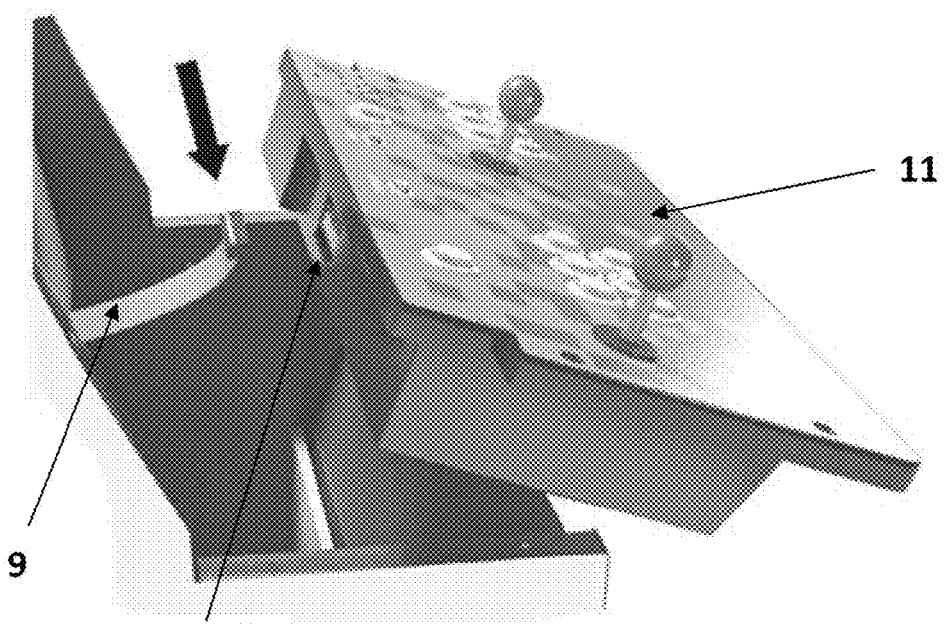
FIGURE 8A
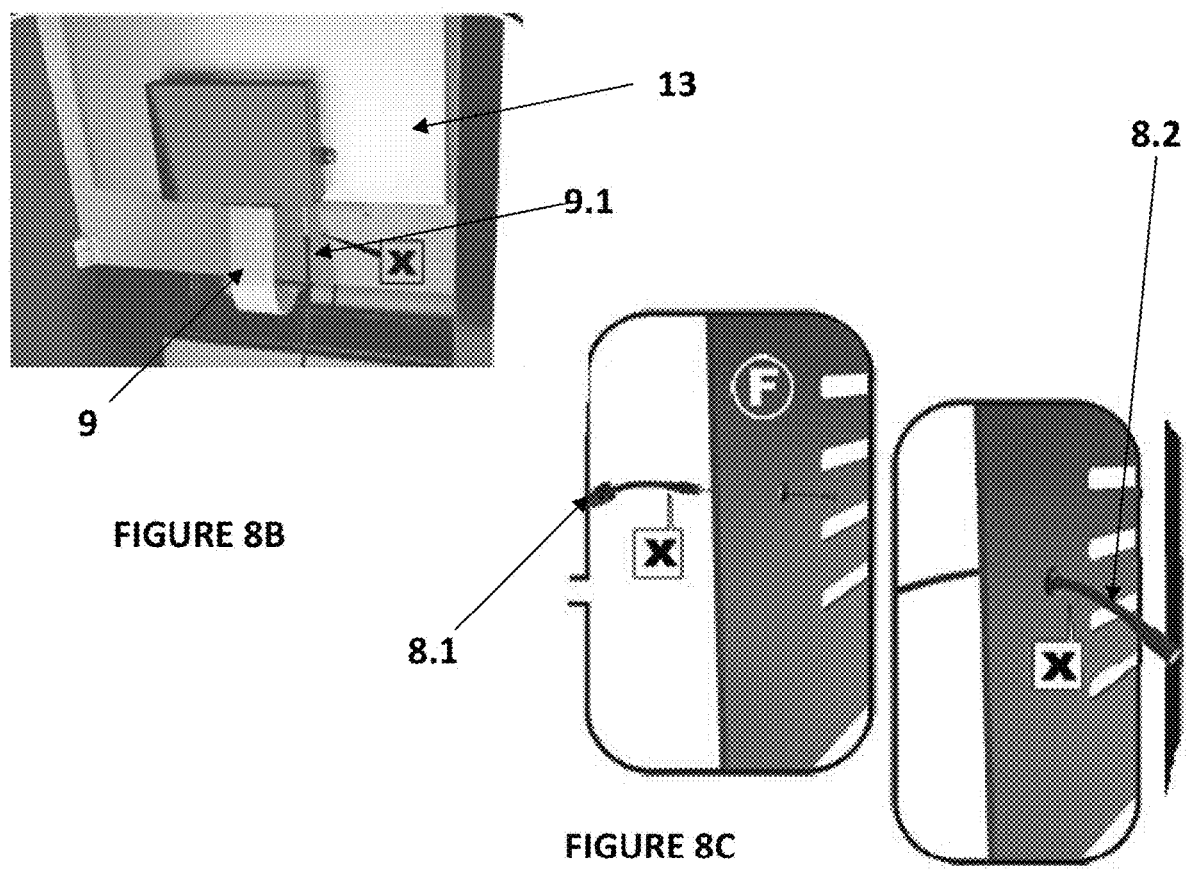
FIGURE 8B
FIGURE 8C

900

| Connect controller using wire jack | ← 910 |

| Connect screen and electronics module using other end of wire jack and connect power to electronics module | ← 920 |

| Connect power connections through back panel | ← 930 |

| Connect A/C module to electrical connection | ← 940 |

FIGURE 9

HOME ARCADE SYSTEM

CROSS REFERENCE TO RELATED APPLICATIONS

This application is a continuation of U.S. application Ser. No. 16/222,729, filed Dec. 17, 2018, which claims the benefit of U.S. provisional application No. 62/599,438 filed Dec. 15, 2017 and U.S. provisional application No. 62/609,741 filed Dec. 22, 2017, which are both incorporated by reference as if fully set forth.

FIELD OF INVENTION

The present invention is related to video games, and more particularly to a home arcade system.

BACKGROUND

There is a large gap in the toy gaming market. For example, there are mini handheld games, classic consoles for playing home video games on the television, and arcade cabinet games. In many cases the mini handheld games range in cost from $10-30. The console games generally range in cost from $50-90. While the arcade cabinet games cost upwards of $3,500. A need exists for gaming systems that provide an arcade like experience, but do so for home use with a cost less than the $3,500 for cabinet games. The home use may include the ability to assemble in position. Also key to this is the need for real "officially licensed content".

SUMMARY

The present invention provides an affordable at-home toy arcade game experience. This invention brings authentic arcade game play into the home and dormitory. The invention utilizes authentic joysticks and buttons, with an LED screen. The game console is plug-n-play and provides 2-6 games, for example, in 1 game cabinet with one game featured in the cabinet art. The present invention is designed to be sold in a retail box through box retailer and assembled at home into the game console for use. The retail box can be configured either horizontal or vertical. The present invention is further detailed in the following pages and figures.

A home arcade system and method are described. The system and method provide a home arcade system designed to be purchased unassembled and assembled at home in position. The system and method include an outer housing of the arcade system formed from assembly of a left side panel, a right side panel, a back panel, a front panel, and a top label panel, a support system within the outer housing configured to provide additional support to ones of the panels forming the outer housing, a screen display configured to display the arcade game to at least one user, the screen being assembled within the outer housing, a controller panel assembled to the outer housing allowing the at least one user to interact with the arcade game using controls affixed thereto while viewing the screen display, and electronics necessary to provide the game screen on the screen display and to interact with the at least one user within the controls on the controller panel. The arcade system includes a primary arcade game and additional secondary games, the controls on the controller panel providing appropriate input for the primary and secondary games. Ones of the panels include art work for the primary arcade game. The support system includes a front support, a back support and a base support configured to provide additional rigidity to the arcade system when assembled. The support system includes a left bracket and right bracket configured to provide additional rigidity to the arcade system when assembled. The screen display includes a 17-19 inch LED display. The system and method may further include a screen frame configured to provide protection to the screen display and/or a window frame to add finishing to the area around the display. The controller panel is designed to hold at least one of the printed circuit board (PCB), joysticks, buttons and controllers for the games included.

BRIEF DESCRIPTION OF THE DRAWINGS

A more detailed understanding may be had from the following description, given by way of example in conjunction with the accompanying drawings wherein:

FIG. 9 illustrates a method of electrically assembling the arcade system of FIG. 1;

DETAILED DESCRIPTION

Figure 1:
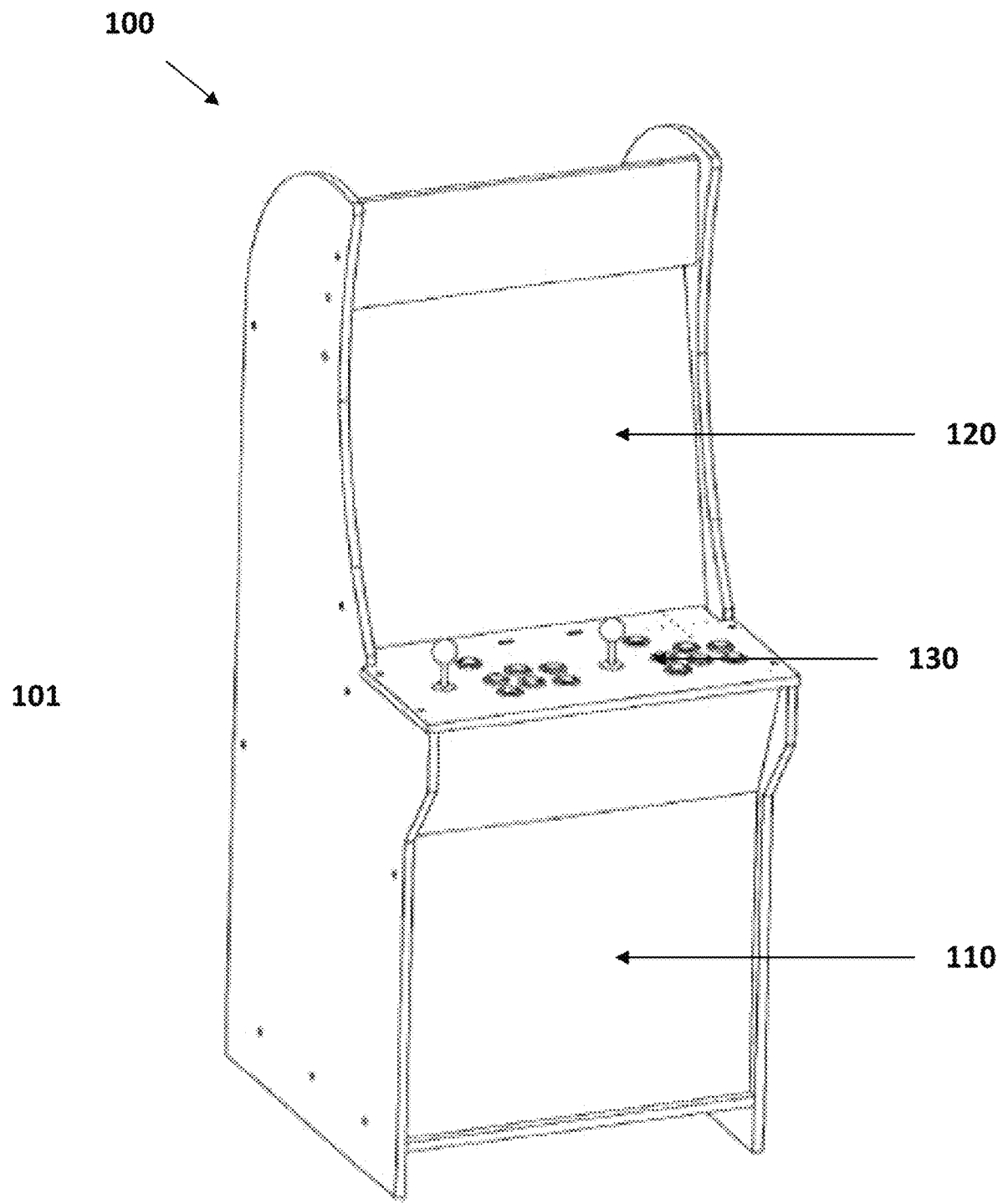
FIG. 1 illustrates an isometric view of the present arcade system.

In the following description, numerous specific details are set forth, such as particular structures, components, materials, dimensions, processing steps, and techniques, in order to provide a thorough understanding of the present embodiments. However, it will be appreciated by one of ordinary skill of the art that the embodiments may be practiced without these specific details. In other instances, well-known structures or processing steps have not been described in detail in order to avoid obscuring the embodiments. It will be understood that when an element such as a layer, region, or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath," "below," or "under" another element, it can be directly beneath or under the other element, or intervening elements may be present. In contrast, when an element is referred to as being "directly beneath" or "directly under" another element, there are no intervening elements present.

In the interest of not obscuring the presentation of embodiments in the following detailed description, some structures, components, materials, dimensions, processing steps, and techniques that are known in the art may have been combined together for presentation and for illustration purposes and in some instances may have not been described in detail. In other instances, some structures, components, materials, dimensions, processing steps and techniques that are known in the art may not be described at all. It should be understood that the following description is rather focused on the distinctive features or elements of various embodiments described herein.

The present invention provides an affordable at-home toy arcade game experience. This invention brings authentic arcade game play into the home and dormitory. The invention utilizes authentic joysticks and buttons, with an LED screen. The game console is plug-n-play and provides 2-6 games in 1 game cabinet with one game featured in the cabinet art. The present invention is designed to be sold in a retail box through box retailer and assembled at home into the game console for use. The retail box can be configured either horizontal or vertical. The present invention is further detailed in the following pages and figures.

A home arcade system and method are described. The system and method provide a home arcade system designed to be purchased unassembled and assembled at home in position. The system and method include an outer housing of the arcade system formed from assembly of a left side panel, a right side panel, a back panel, a front panel, and a top label panel, a support system within the outer housing configured to provide additional support to ones of the panels forming the outer housing, a screen display configured to display the arcade game to at least one user, the screen being assembled within the outer housing, a controller panel assembled to the outer housing allowing the at least one user to interact with the arcade game using controls affixed thereto while viewing the screen display, and electronics necessary to provide the game screen on the screen display and to interact with the at least one user within the controls on the controller panel. The arcade system includes a primary arcade game and additional secondary games, the controls on the controller panel providing appropriate input for the primary and secondary games. Ones of the panels include art work for the primary arcade game. The support system includes a front support, a back support and a base support configured to provide additional rigidity to the arcade system when assembled. The support system includes a left bracket and right bracket configured to provide additional rigidity to the arcade system when assembled. The screen display includes a 17-19 inch LED display. The system and method may further include a screen frame configured to provide protection to the screen display and/or a window frame to add finishing to the area around the display. The controller panel is designed to hold at least one of the printed circuit board (PCB), joysticks, buttons and controllers for the games included.

FIG. 1 illustrates an isometric view of the present arcade system 100. The arcade system 100 may be assembled from pieces to the final assembled unit 101. The pieces may include the panels of the cabinet 110, the control unit 130, a display 120 and other internal structures and electronic pieces (not shown in FIG. 1). Once assembled the arcade system may be used and played as if in the arcade.

Figure 2:
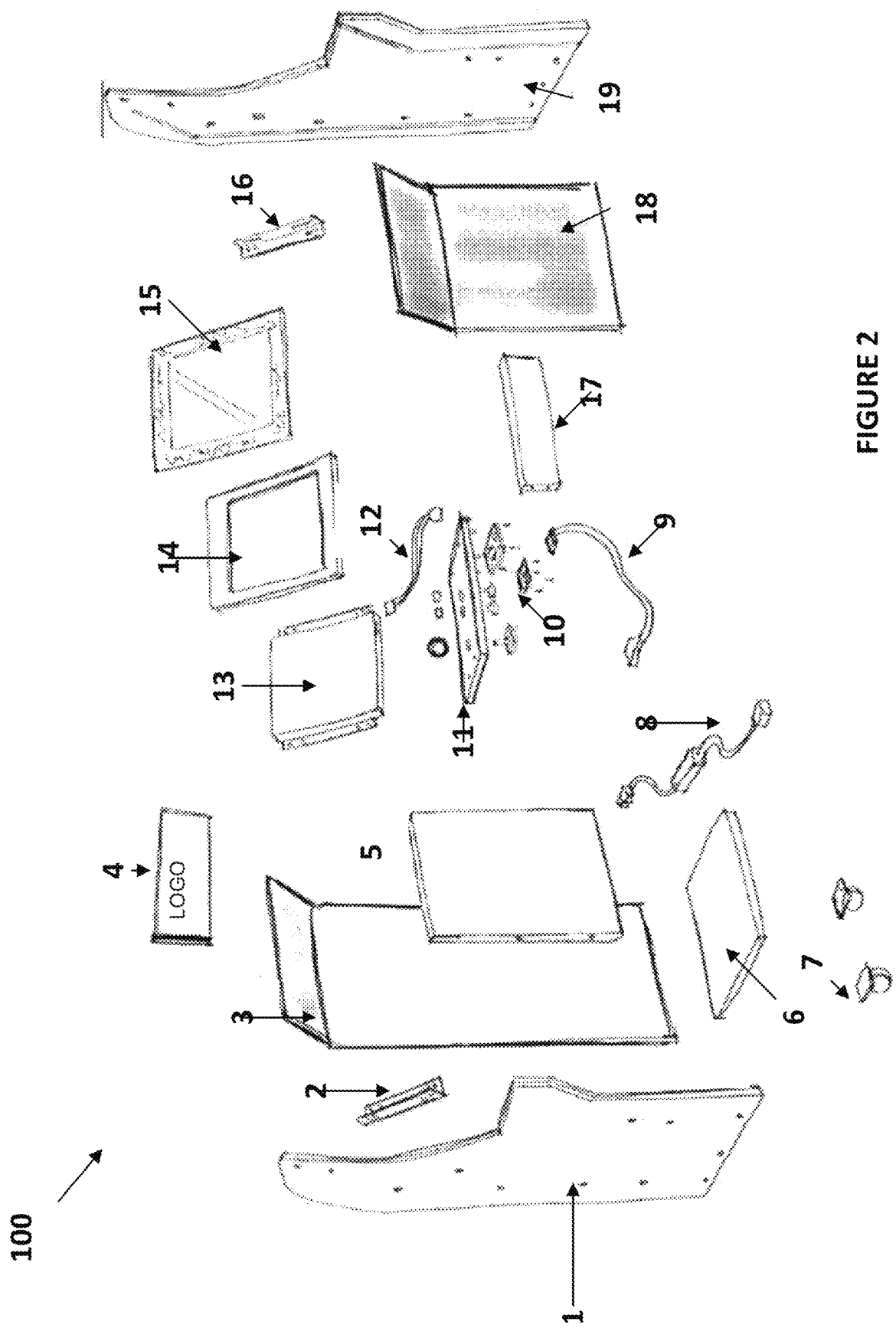
FIG. 2 illustrates an exploded view of the arcade system of FIG. 1.

FIG. 2 illustrates an exploded view of the arcade system 100 of FIG. 1. The arcade system 100 includes a left side panel 1 and a right side panel 19 and a back panel 3 and a front panel 18 as well as a top label panel 4. Each of these panels may include art work for the primary game as described or the art work may be included to be applied to these panels. The left side panel 1, right side panel 19, back panel 3, front panel 18 and top label panel 4 may be assembled to form the outer housing of the arcade system. Support panels may also be provided as needed. In FIG. 2, there is illustrated a front support 17, a back support 5 and a base support 6. These support panels 5, 6, 17 collectively provide additional rigidity to the arcade system 100 when assembled. A number of brackets, such as a left bracket 2 and right bracket 16, may also be used to provide additional rigidity to the structure. Wheels 7, such as two, three or four wheels, may also be included. As illustrated a set of two wheels 7 may be used.

Display 120 of FIG. 1 may include a screen 13 in addition to other elements to protect and hold screen 13. As discussed herein the screen may be formed from a nineteen inch LED display, although as would be understood by those possessing an ordinary skill in the pertinent arts, any sized screen would functionally work in the arcade system. Screen 13 may be covered by a screen frame 14 for protection and to hold screen 13 in place. Screen frame 14 may also provide aesthetic features near the viewing area of screen 13, for example. A window frame 15 may be used to add finishing to the area around the screen 13. This window frame 15 may provide additional coloring appropriate for the featured game highlighted on the cabinet, for example. The screen may be electrically connected using a video wire 12.

Control unit 130 of FIG. 1 may include a controller panel 11 that is designed to hold the printed circuit board (PCB), joysticks or roller ball (as will be described based on included games below) and controller, collectively controller 10 for the games included. Controller 10 may also house any buttons for game play. The controller panel 11 may include game art work or be designed to receive art work included within the game system during assembly.

Electronics may also be included within the arcade system 100 of FIG. 1. The electronics may include a power supply 8 and a wire jack 9. Power supply 8 may connect, either directly or indirectly, to a power supply, such as a wall outlet, for example. Power supply 8 may provide power to arcade system 100. Wire jack 9 may provide an electronic interface from controller 10 to the electronic system including screen 13.

Figure 3:
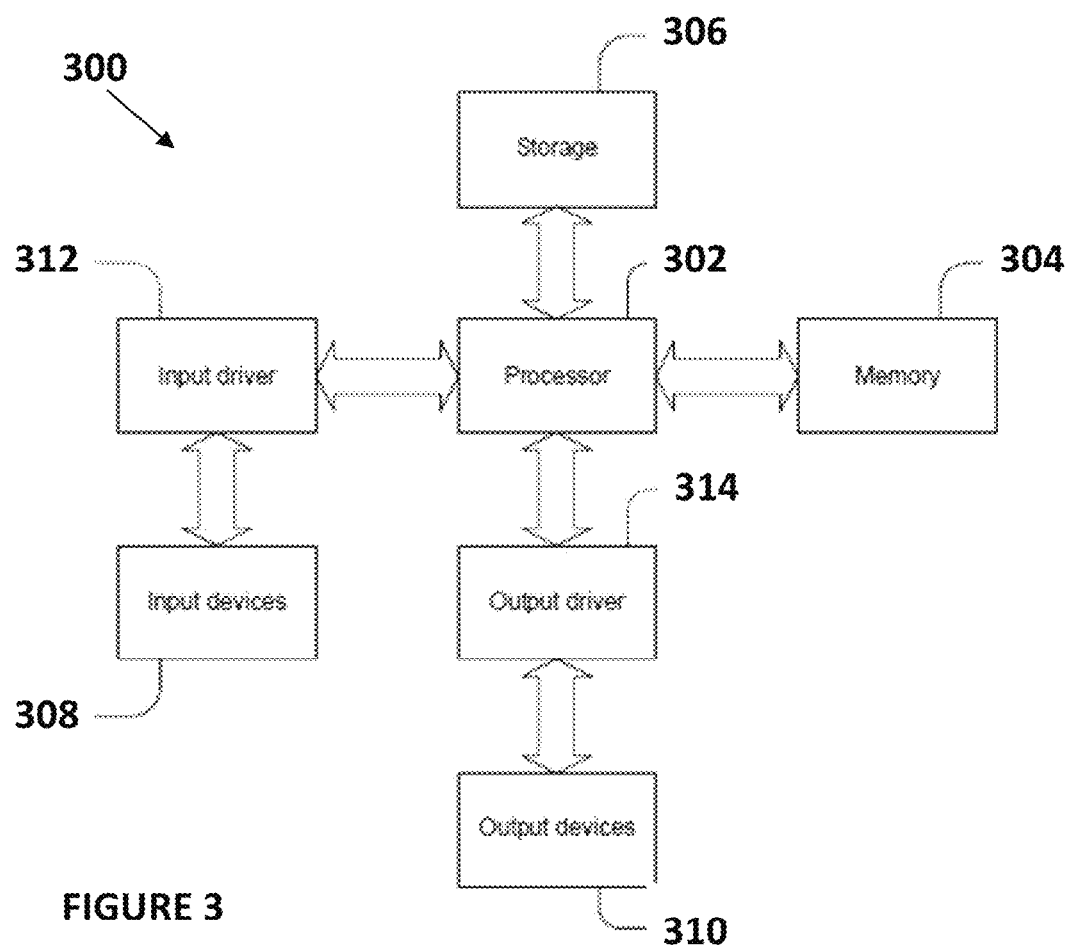
FIG. 3 is a block diagram the electronics of arcade system of FIG. 1.

FIG. 3 is a block diagram the electronics 300 of arcade system 100 of FIG. 1. The electronics 300 includes a processor 302, a memory 304, a storage 306, one or more input devices 308, and one or more output devices 310. The electronics 300 can also optionally include an input driver 312 and an output driver 314. It is understood that the electronics 300 can include additional components not shown in FIG. 3.

In various alternatives, the processor 302 includes a central processing unit (CPU), a graphics processing unit (GPU), a CPU and GPU located on the same die, or one or more processor cores, wherein each processor core can be a CPU or a GPU. In various alternatives, the memory 304 is be located on the same die as the processor 302, or is located separately from the processor 302. The memory 304 includes a volatile or non-volatile memory, for example, random access memory (RAM), dynamic RAM, or a cache.

The storage 306 includes a fixed or removable storage, for example, a hard disk drive, a solid state drive, an optical disk, or a flash drive.

The input devices 308 include, without limitation, a keyboard, a keypad, a touch screen, a touch pad, a detector, a microphone, an accelerometer, a gyroscope, a biometric scanner, joystick, buttons, roller or track ball, or a network connection (e.g., a wireless local area network card for transmission and/or reception of wireless IEEE 802 signals).

In a configuration where a joystick is included as an input device 308, the joystick may operate to translate the movement of a plastic stick into electronic information a computer can process. The various joystick technologies may differ in the amount of information provided. In general, a joystick functions as an electrical switch. This basic design consists of a stick that is attached to a plastic base with a flexible rubber sheath. The base houses a circuit board that sits directly underneath the stick. The circuit board is made up of several wires, which connect to several contact terminals. Ordinary wires extend from these contact points to the computer.

The wires form a simple electrical circuit made up of several smaller circuits. The circuits carry electricity from one contact point to another. When the joystick is in the neutral position the circuits are mostly off. The conductive material in each wire may not be connected, so the circuit does not conduct electricity.

When you move the stick in any direction, it pushes the conductive material against the circuit board to close the circuit and complete the connection between the two wire sections. When the circuit is closed, electricity can flow down a wire from the computer (or game console), through the wire, and to another wire leading back to the computer.

When the computer picks up a charge on a particular wire, it knows that the joystick is in the right position to complete that particular circuit. Pushing the stick forward closes the "forward switch," pushing it left closes the "left switch," and so on. In some designs, the computer recognizes a diagonal position when the stick closes two switches (for example, closing the forward switch and the left switch simultaneously would mean a forward/leftward diagonal position).

For a button input device, the button operates such that when the button is depressed, the circuit is closed and the computer recognizes a fire command.

In a configuration where a trackball is used, the trackball functions as a pointing device. The trackball includes a ball held by a socket containing sensors to detect a rotation of the ball about two axes. As the user rolls the ball to position the on-screen pointer, using their thumb, fingers, or commonly the palm of the hand while using the fingertips to press the mouse buttons. A trackball may have no limits on effective travel.

The output devices 310 include, without limitation, a display, a speaker, a printer, a haptic feedback device, one or more lights, an antenna, or a network connection (e.g., a wireless local area network card for transmission and/or reception of wireless IEEE 802 signals).

The input driver 312 communicates with the processor 302 and the input devices 308, and permits the processor 302 to receive input from the input devices 308. The output driver 314 communicates with the processor 302 and the output devices 310, and permits the processor 302 to send output to the output devices 310. It is noted that the input driver 312 and the output driver 314 are optional components, and that the electronics 300 operates in the same manner if the input driver 312 and the output driver 314 are not present.

Figure 4:
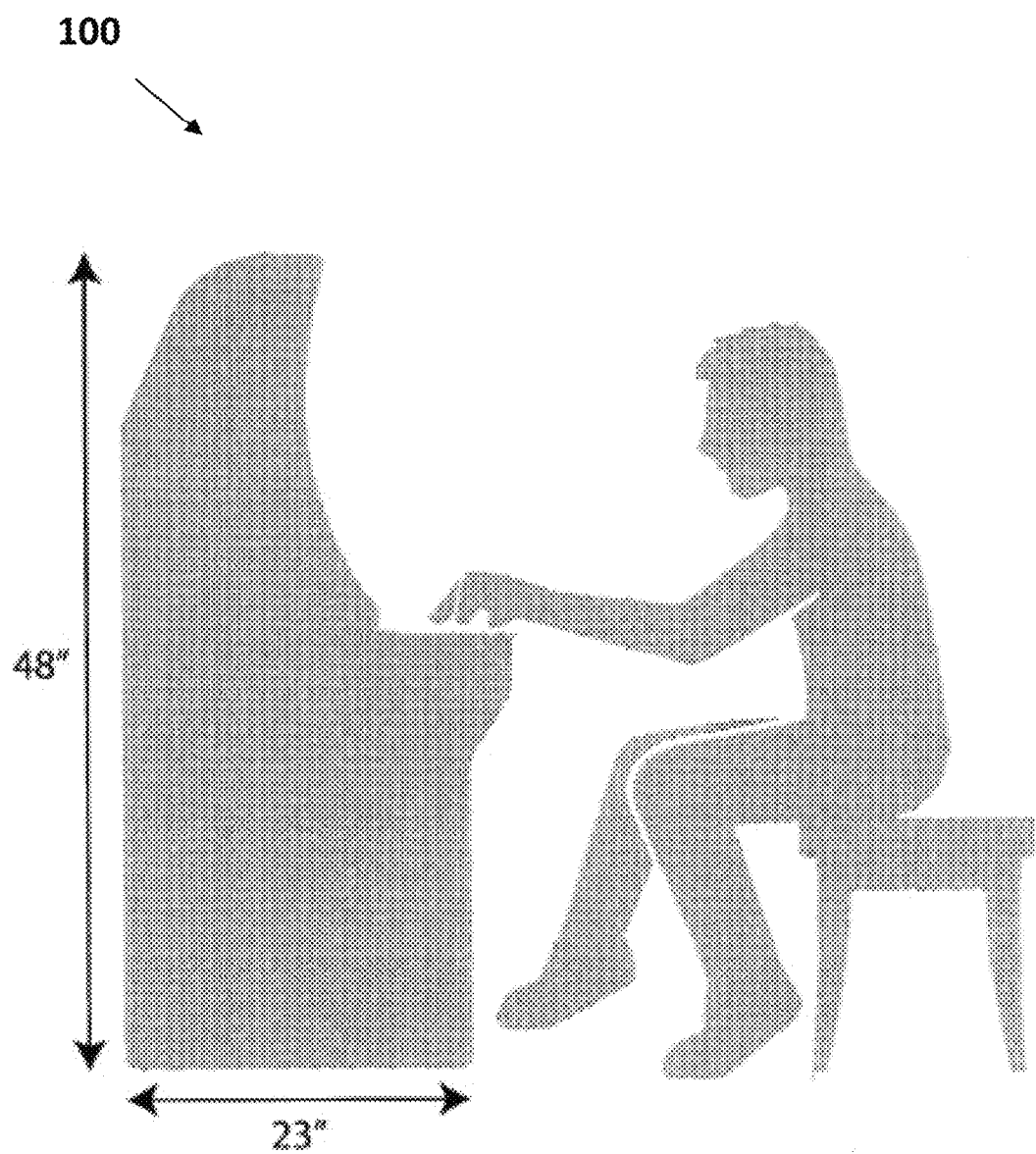
FIG. 4 illustrates the size of the assembled arcade system of FIG. 1.

FIG. 4 illustrates the size of the assembled arcade system of FIG. 1. As illustrated, the height of the arcade system is approximately four feet and the depth is approximately two feet and is approximately a foot and a half wide. The arcade system when assembled is approximately seventy pounds. A user may interact with the gaming system from a seated position, obviously depending on the height of the user.

The arcade system provides authentic joysticks and buttons. The system may be used in single game or multi-game modes and may come as single or double player units. The system may be designed to include or not include coin slots. There is a color LED display used for gaming. In an embodiment, the screen may be approximately nineteen inches.

Figure 5:
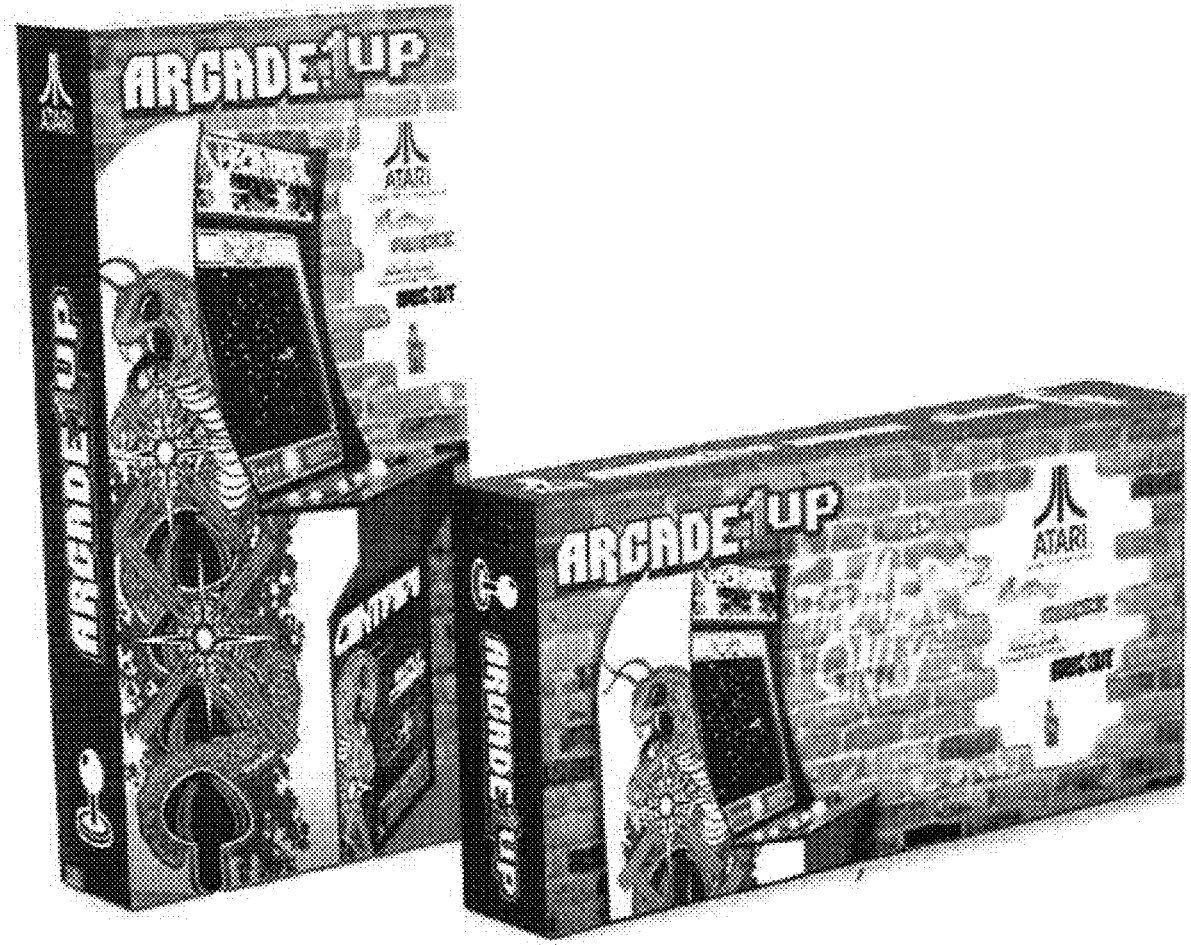
FIG. 5 illustrates the packaging size of the arcade system of FIG. 1.

FIG. 5 illustrates the packaging size of the arcade system of FIG. 1. As shown in FIG. 5, the pre-assembled arcade system may be provided by retailers within a box. The box may be oriented either vertical (A) or horizontal (B). The box may be approximately 4×2×0.5 feet, or more specifically 52×24×6 inches. The box may provide indication of the games included within the system and identify the art that included or provided for the cabinet.

FIG. 6 illustrates arcade system 100 of FIG. 1 at various states during mechanical assembly depicted in FIGS. 6A-J illustrating various states of mechanical assembly of arcade system 100. FIG. 7 illustrates a method 700 of mechanically assembling arcade system 100 of FIG. 1. FIGS. 6A-J (collectively FIG. 6) are described herein accompanied by a description of FIG. 7.

Figure 6A:
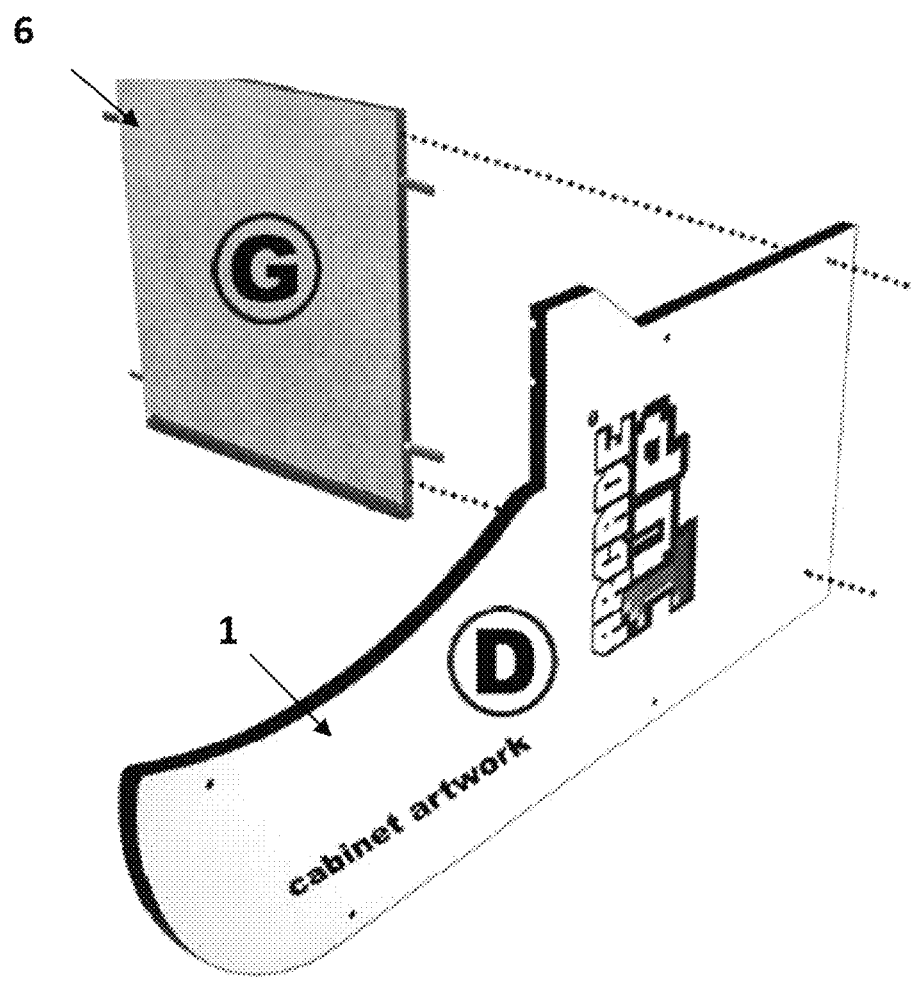
FIG. 6 illustrates the arcade system of FIG. 1 at various states during mechanical assembly depicted in FIGS. 6A-J (collectively referred to as FIG. 6), each illustrating various states of mechanical assembly of the arcade system of FIG. 1.
Figure 6B:
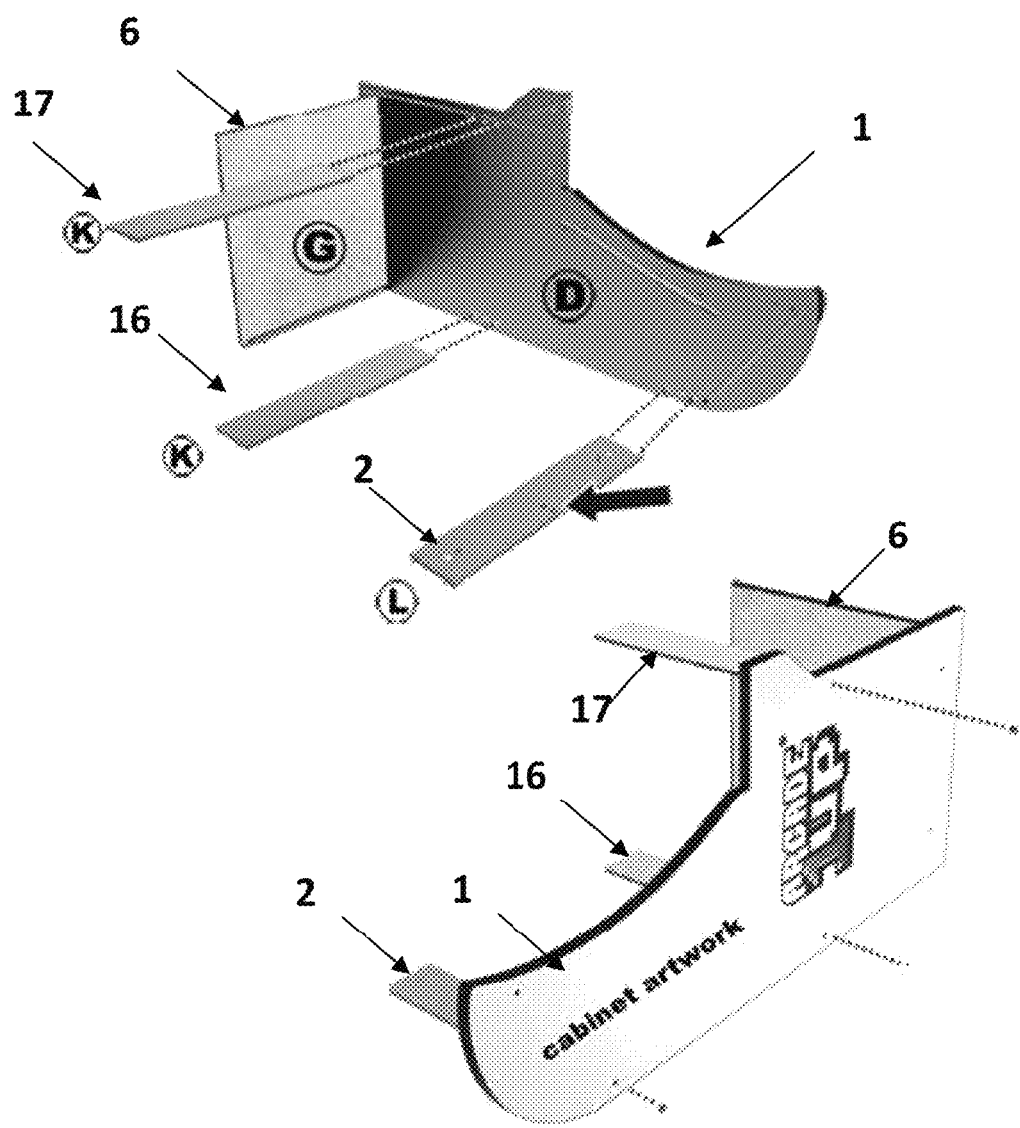
Figure 6C:
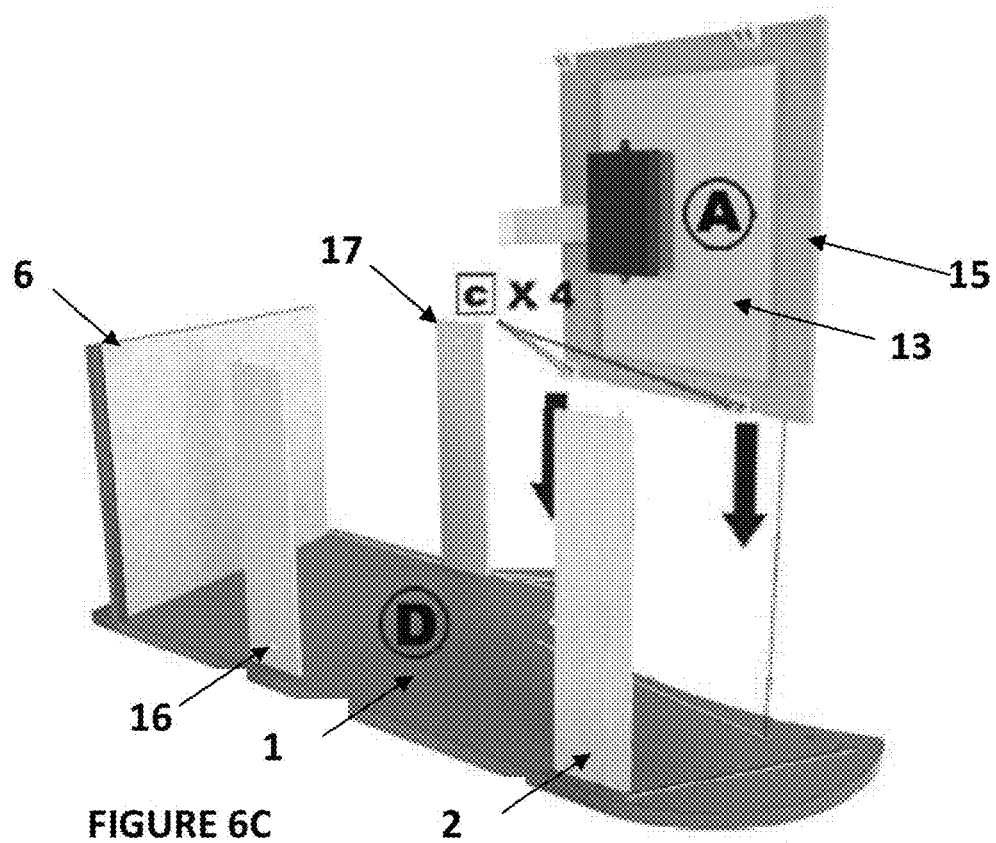
Figure 6D:
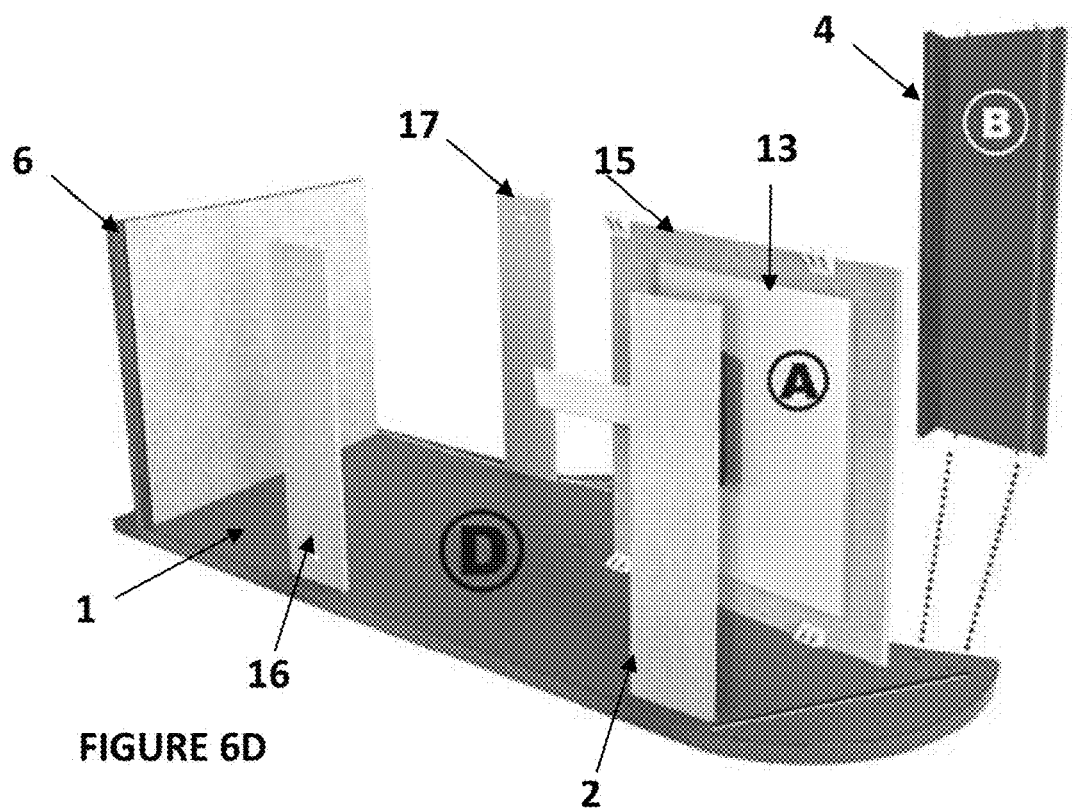
Figure 6E:
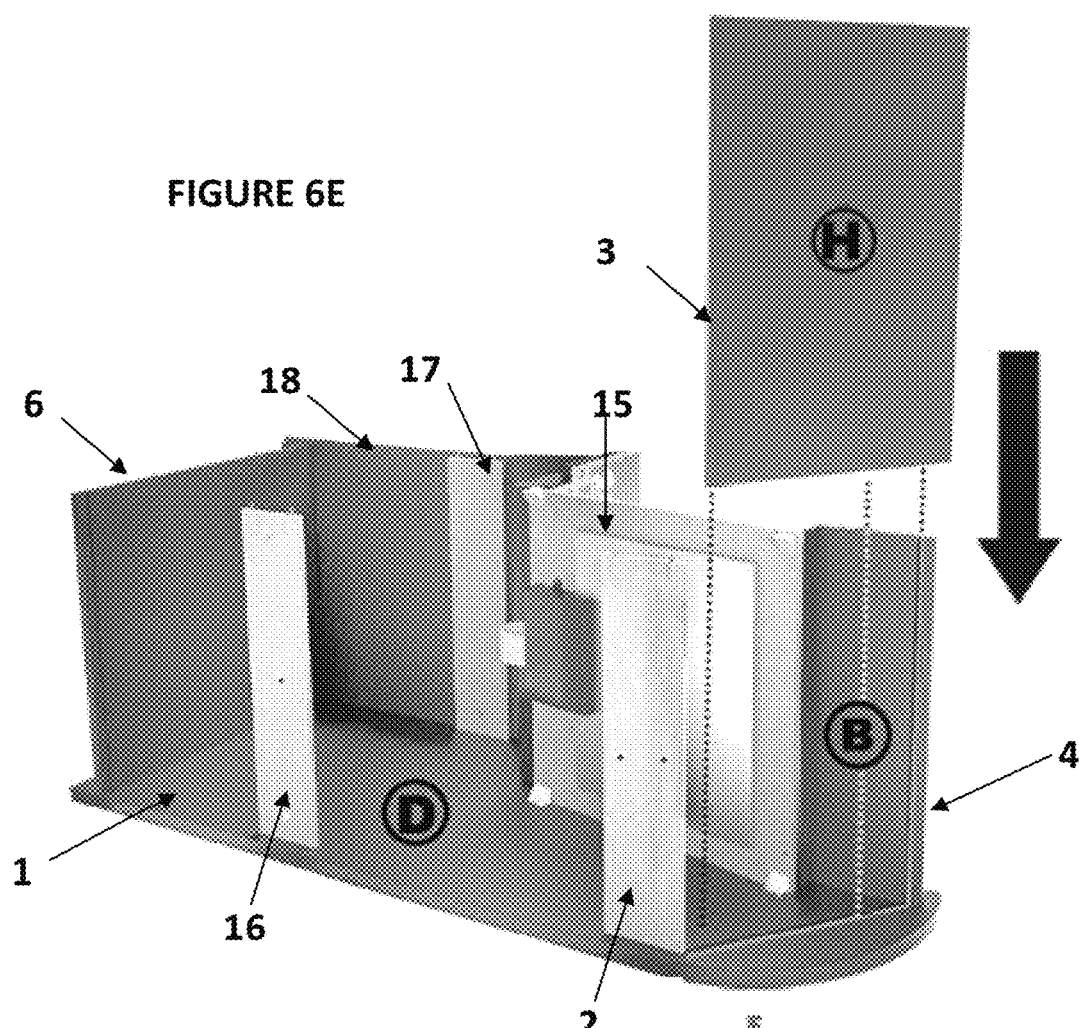
Figure 6F:
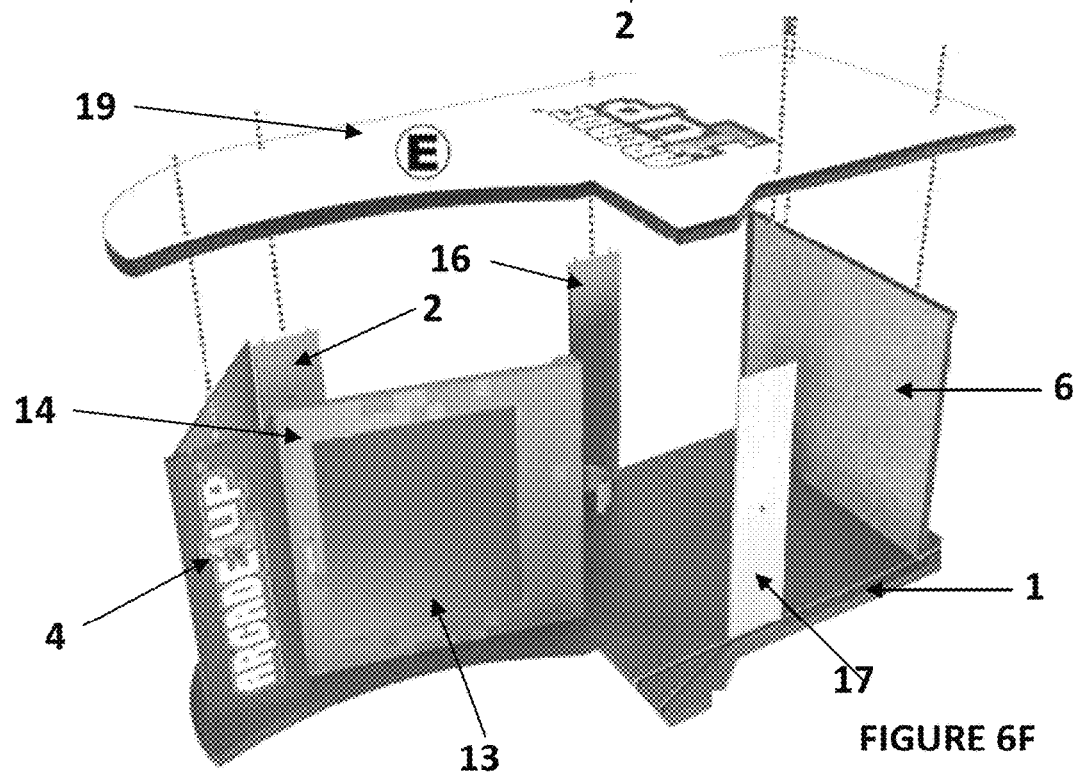
Figure 6G:
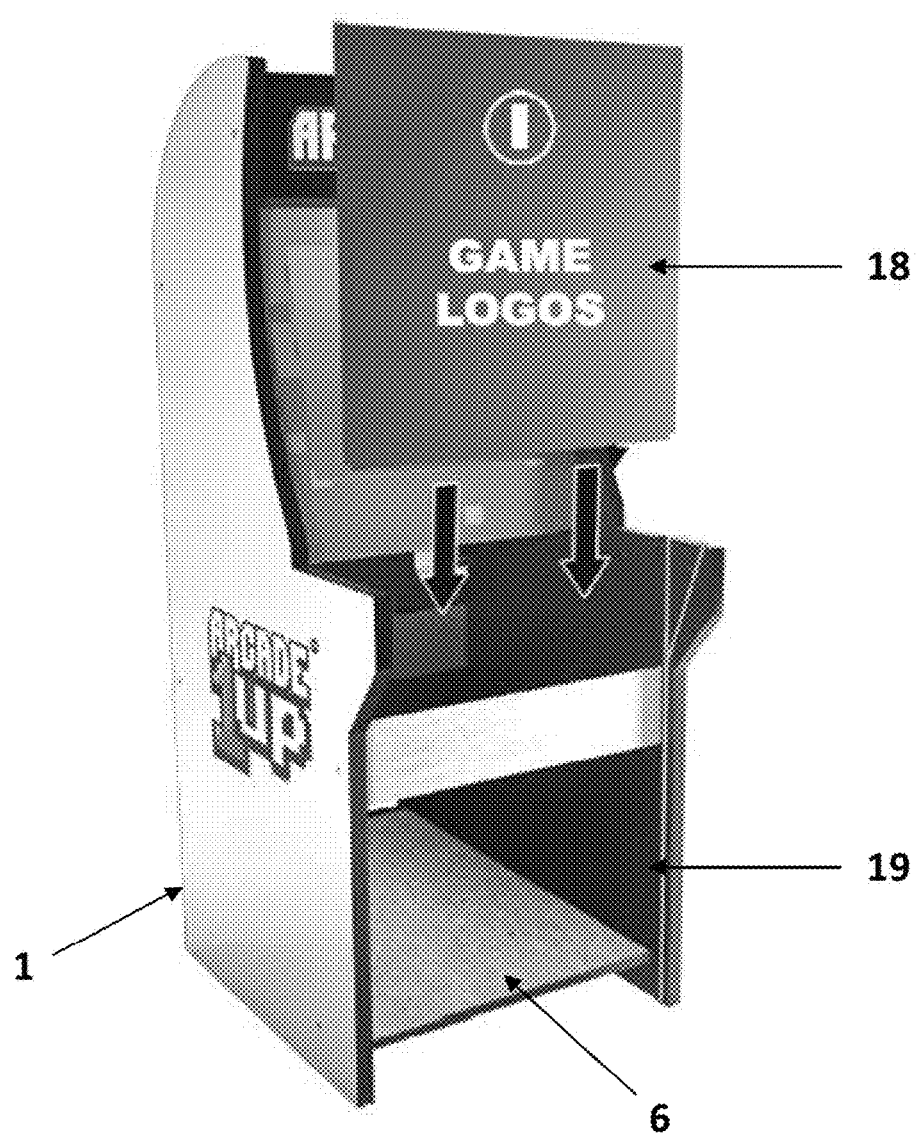
Figure 6H:
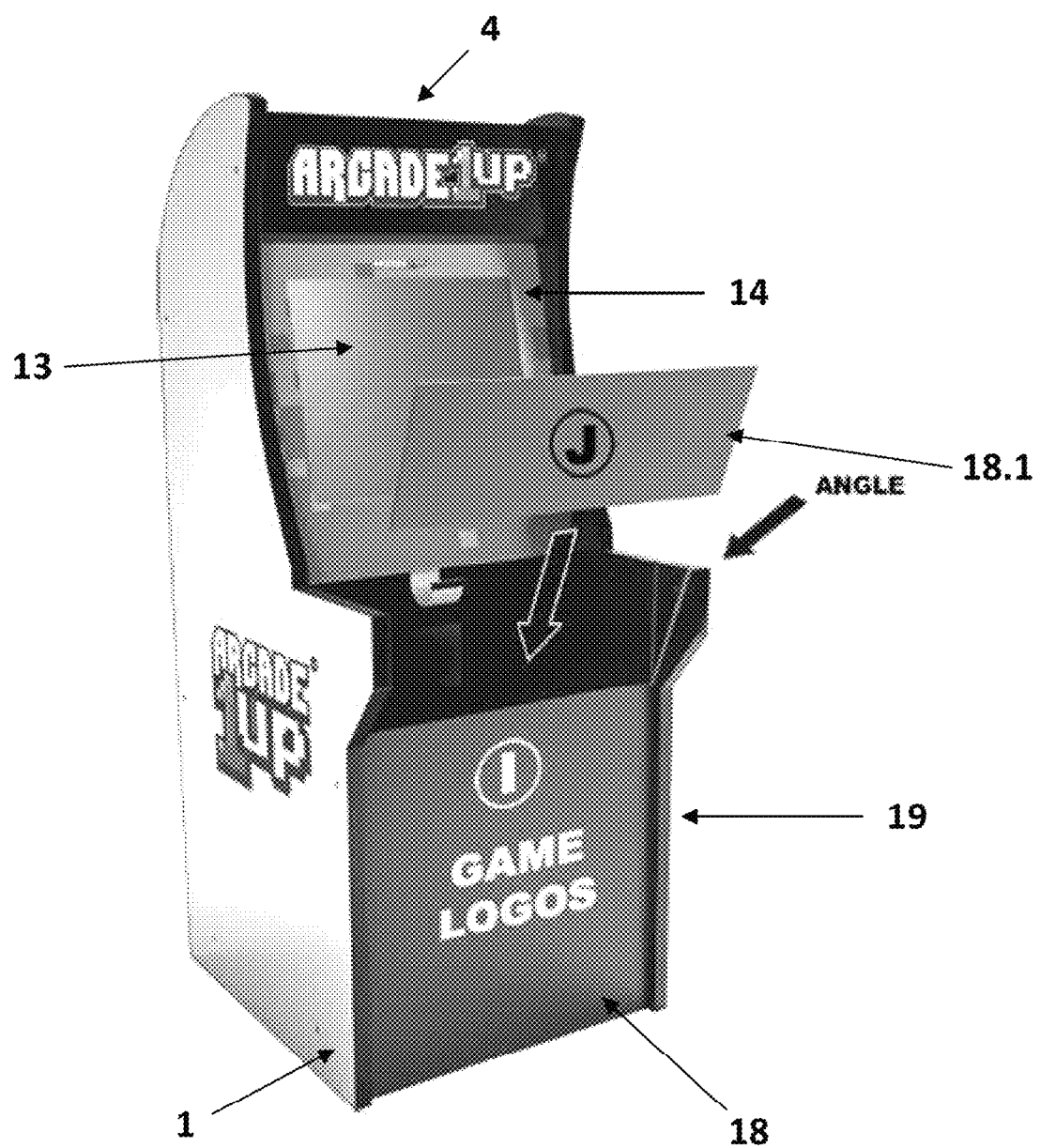
Figure 6I:
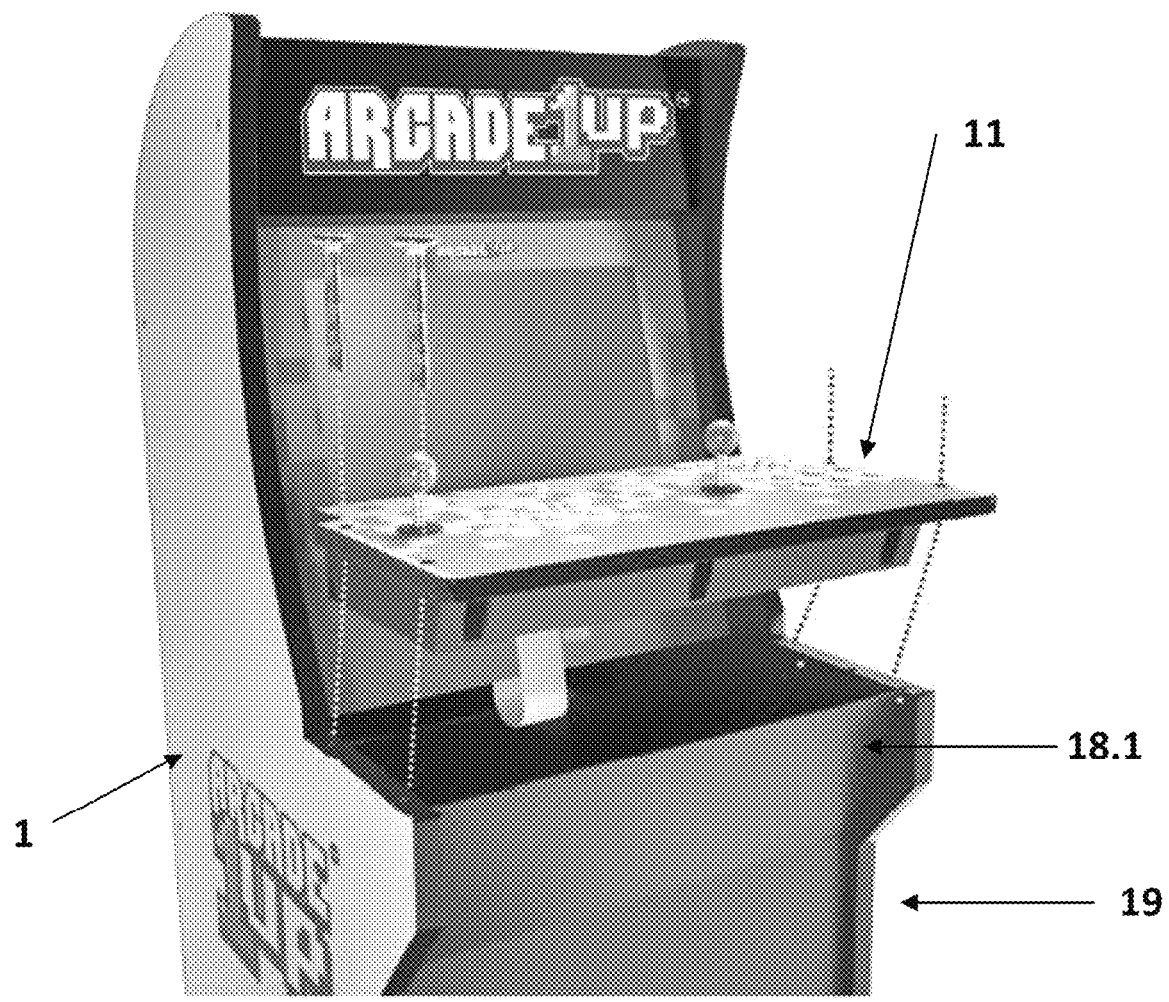
Figure 6J:
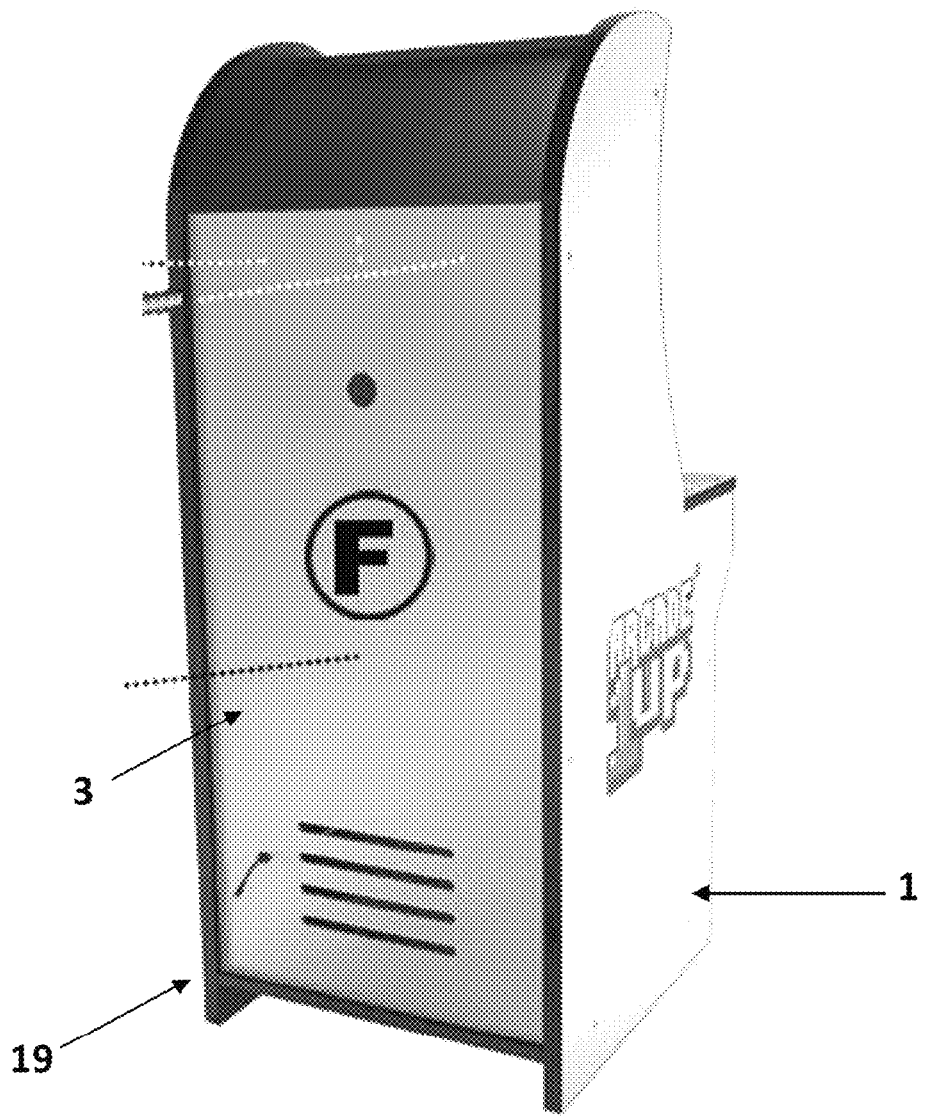
Figure 7:
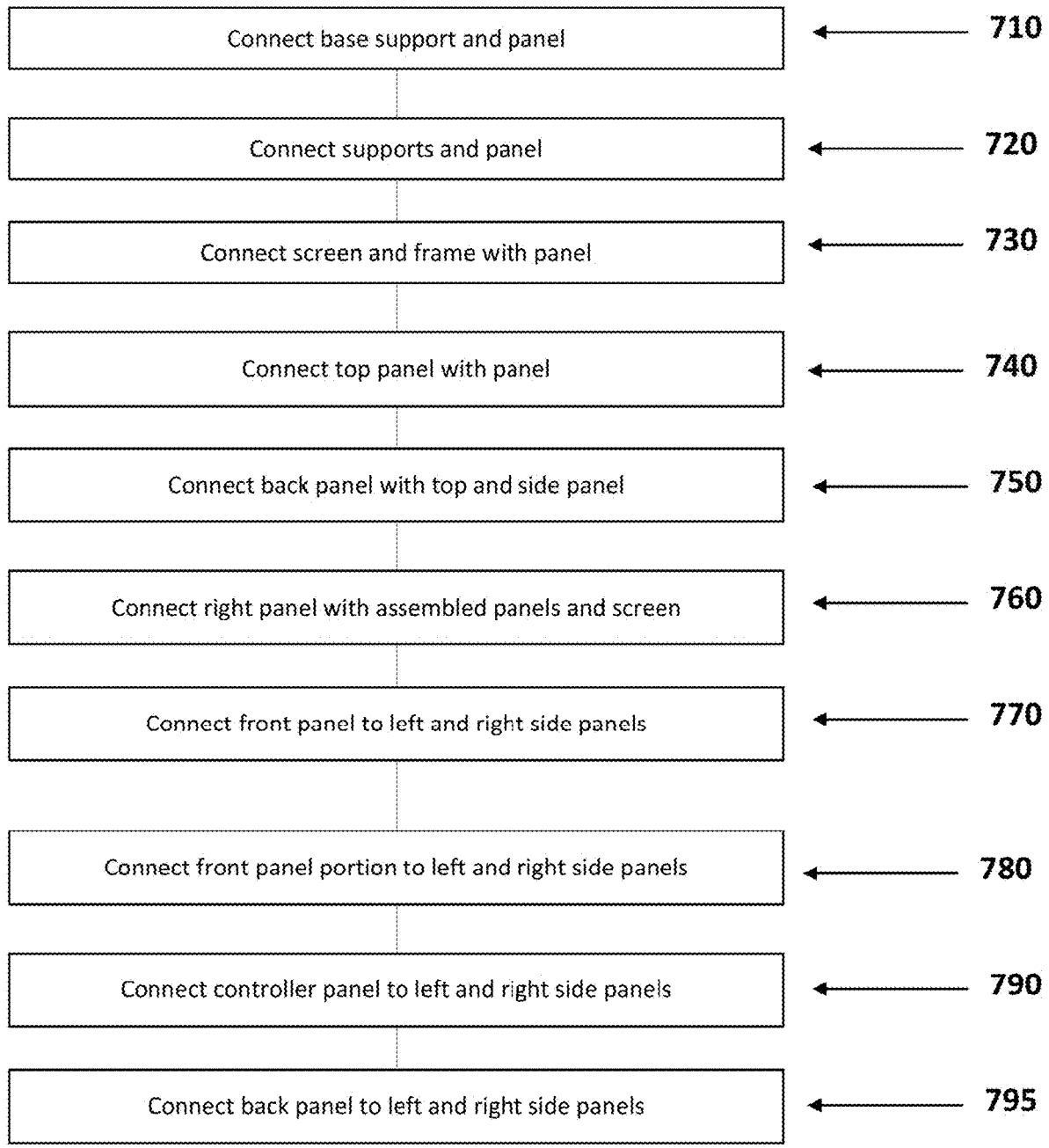
FIG. 7 illustrates a method of mechanically assembling the arcade system of FIG. 1.

FIG. 6A illustrates the left side panel 1 of arcade system 100 being mechanically connected with base support 6 at step 710 in method 700. FIG. 6B illustrates support 2 (in place of left bracket 2), support 16 (in place of right bracket 16), and front support 17 being mechanically connected to the left side panel 1 as depicted in view (1) and view (2) at step 720 in method 700. FIG. 6C illustrates the screen 13, screen frame 14 (not shown), and window frame 15 being mechanically connected with left side panel 1 at step 730 in method 700. FIG. 6D illustrates top label panel 4 being mechanically connected to left side panel 1 at step 740 in method 700. FIG. 6E illustrates back panel 3 being mechanically interconnected with top label panel 4 and left side panel 1 at step 750 in method 700. FIG. 6F illustrates right side panel 19 being mechanically connected to the assembly of left side panel 1 and the other elements assembled in FIGS. 6A-E at step 760 in method 700. FIG. 6G illustrates front panel 18 being mechanically connected to left side panel 1 and right side panel 19 and supported by front support 17 at step 770 in method 700. FIG. 6H illustrates a front panel portion 18.1 being mechanically connected to left side panel 1 and right side panel 19 and supported by front support 17 at step 780 in method 700. FIG. 6I illustrates the controller panel 11 being mechanically connected with left side panel 1 and right side panel 19 and supported by front panel portion 18.1 at step 790 in method 700. FIG. 6J illustrates back panel 3 being mechanically connected to left side panel 1 and right side panel 19 and supported by supports 2, 16 (not shown) at step 795 in method 700. While FIG. 6 illustrates connecting the elements to the left side panel 1, one of ordinary skill in the pertinent arts would understand other connections including connecting first to right side panel 19 may be utilized.

Figure 8D:
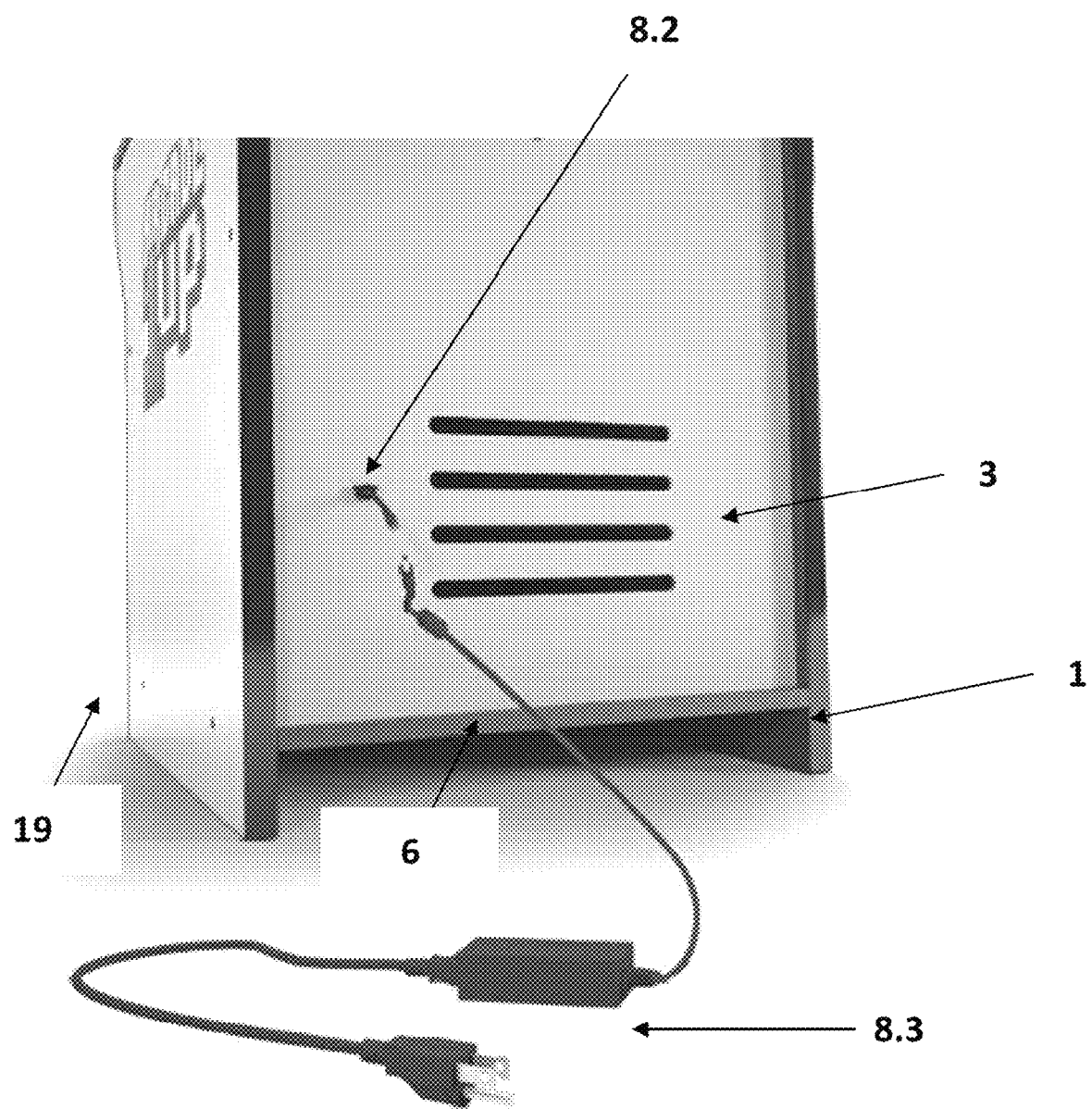
FIG. 8 illustrates the arcade system of FIG. 1 at various states during electrical assembly depicted in FIGS. 8A-D (collectively referred to as FIG. 8), each illustrating various states of electrical assembly of the arcade system of FIG. 1.

FIG. 8 illustrates arcade system 100 of FIG. 1 at various states during electrical assembly depicted in FIGS. 8A-D illustrating various states of electrical assembly of arcade system 100. FIG. 9 illustrates a method 900 of electrically assembling arcade system 100 of FIG. 1. FIGS. 8A-D (collectively FIG. 8) are described herein accompanied by a description of FIG. 9.

FIG. 8A illustrates the mechanical connection of controller panel 11 with left and right side panels 1, 19. The controller 10 is connected electrically using a wire jack 9 at step 910 in method 900. FIG. 8B illustrates the other end of wire jack 9 being interconnected with screen 13 and power provided to electronics module via electrical connection 9.1 at step 920 in method 900. FIG. 8C illustrates the electrical connection distal to electronics module where power is interconnected through back panel 3 via connector 8.1 and connector 8.2 at step 930 in method 900. FIG. 8D illustrates the connection of connector 8.2 to AC module 8.3, at step 940 in method 900. The AC module 8.3 may then be electrically connected to a wall power plug, for example. Connectors 9.1. 8.1, 8.2 and 8.3 may be components of power supply 8. While FIGS. 8 and 9 together depict one method of electrically connecting arcade system 100, one of ordinary skill in the pertinent arts would understand other electrical connections may be utilized.

Figure 10:
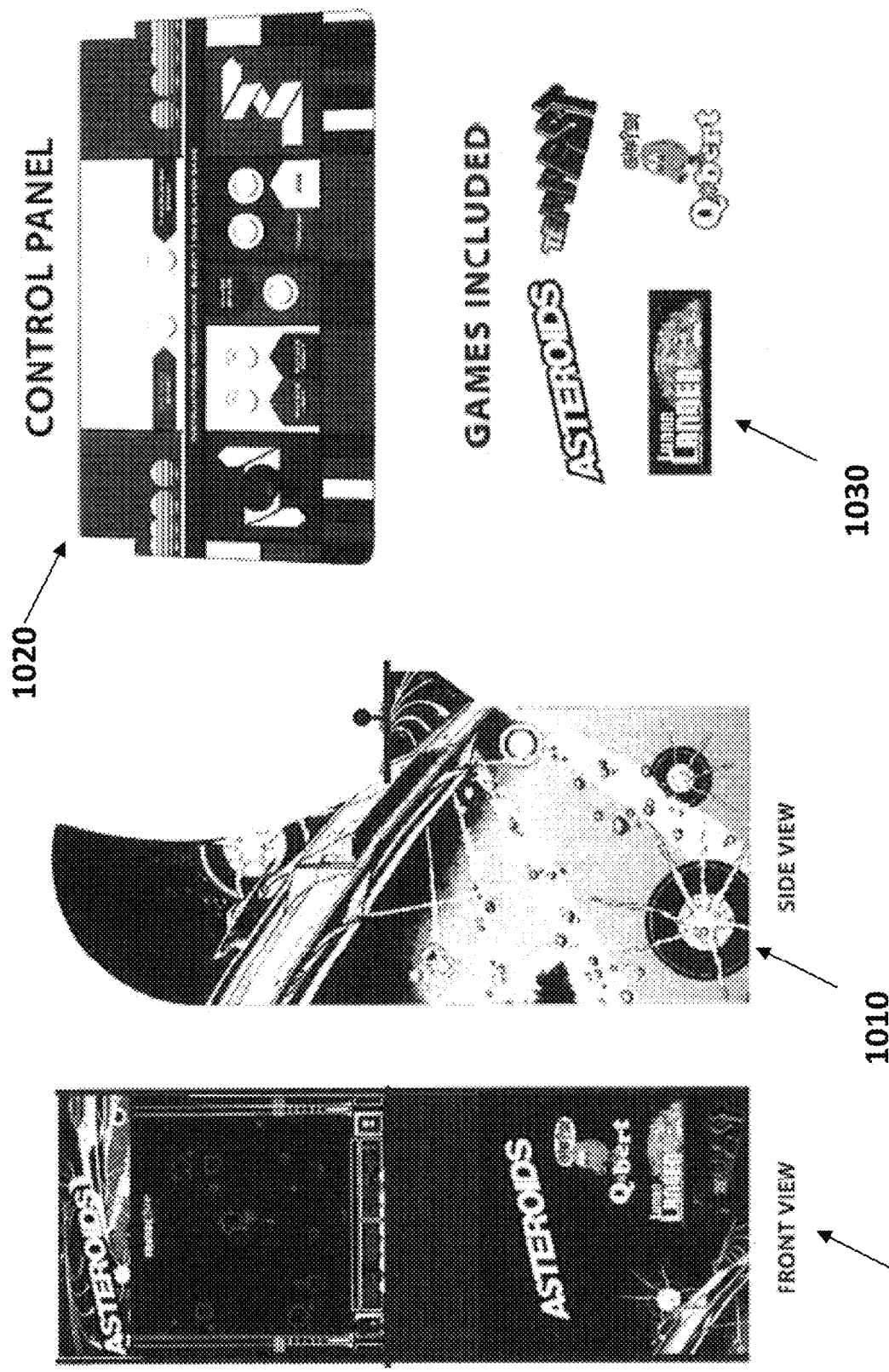
FIG. 10 illustrates a front view, side view, controller view and included games view for an example gaming system of the arcade system of FIG. 1.

FIG. 10 illustrates a front view 1000, side view 1010, controller view 1020 and included games view 1030 for an example gaming system of the arcade system 100 of FIG. 1. In FIG. 10, there is the gaming system of Asteroids. As is illustrated in FIG. 10, the arcade system 100 is decorated as if it is the arcade cabinet of Asteroids. This includes the sides of the unit 1, 19, above the display portion 4 of the unit and below the controller portion 11 of the unit. The front view 1000 illustrates additional games below the console 18 that are included in the game system 100. Further details of additional games as illustrated in games view 1030 depicting QBert, Tempest, and Lunar Lander along with Asteroids.

The game system 100 includes the original cabinet art of the main game Asteroids, provides authentic gameplay for each of the four included games and provides a classic joystick. For example, control panel 1020 provides for control of the spaceship, rotation left and right by buttons, and thrust and fire buttons. There is also a one-player and two-player game mode.

Figure 11:
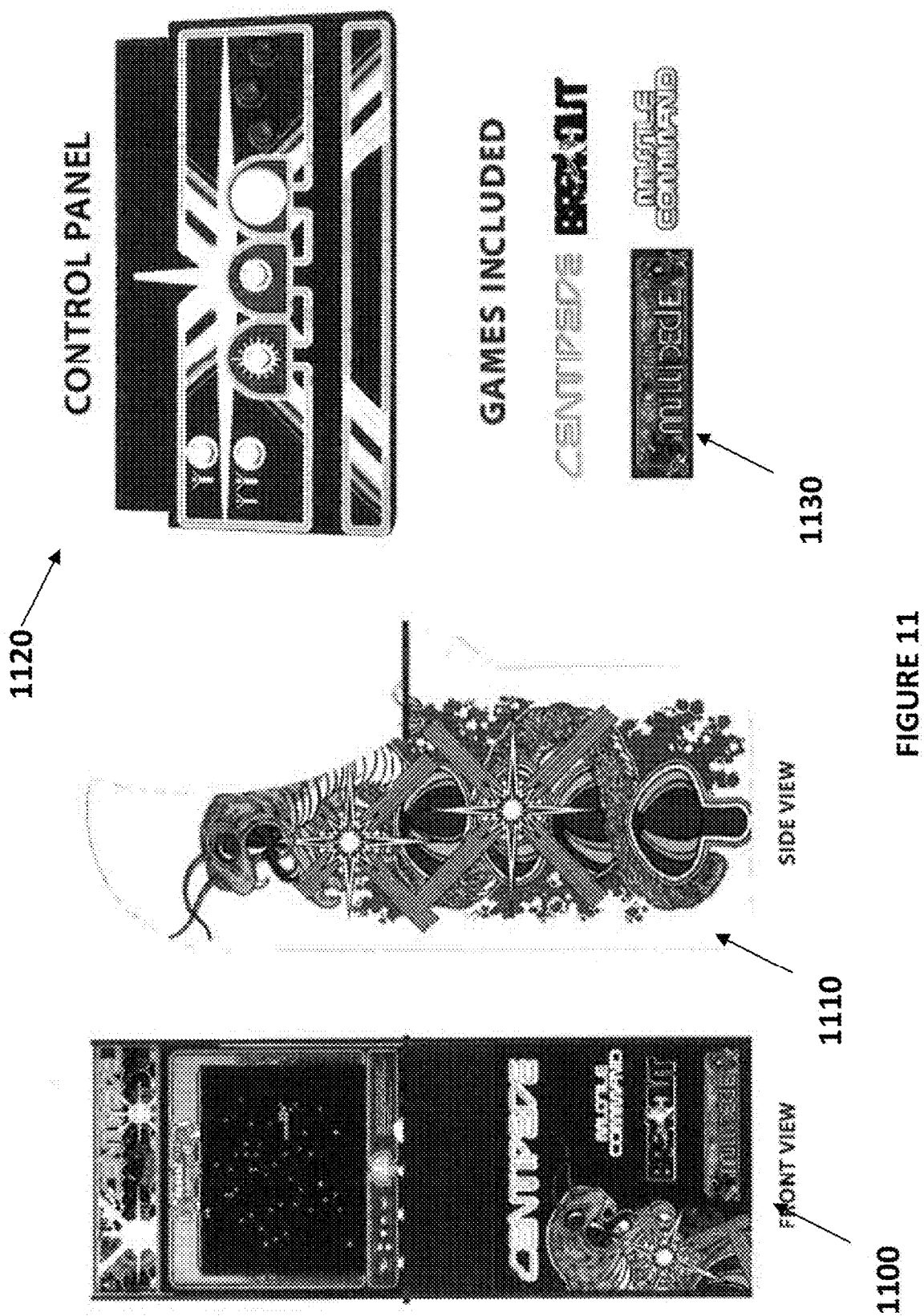
FIG. 11 illustrates a front view, side view, controller view and included games view for an example gaming system of the arcade system of FIG. 1.

FIG. 11 illustrates a front view 1100, side view 1110, controller view 1120 and included games view 1130 for an example gaming system of the arcade system 100 of FIG. 1. In FIG. 11, there is the gaming system of Centipede. As is illustrated in FIG. 11, the arcade system 100 is decorated as if it is the arcade cabinet of Centipede. This includes the sides of the unit 1, 19, above the display portion 4 of the unit and below the controller portion 11 of the unit. The front view 1100 illustrates additional games below the console that are included in the game system. Further details of additional games as illustrated in games view 1130 depicting Missile Command, Breakout, and Millipede along with Centipede.

The game system 100 includes the original cabinet art of the main game Centipede, provides authentic gameplay for each of the four included games and provides a classic trackball. For example, control panel 1120 provides for control of the Pede by using the trackball, and various buttons. There is also a one-player and two-player game mode.

Figure 12:
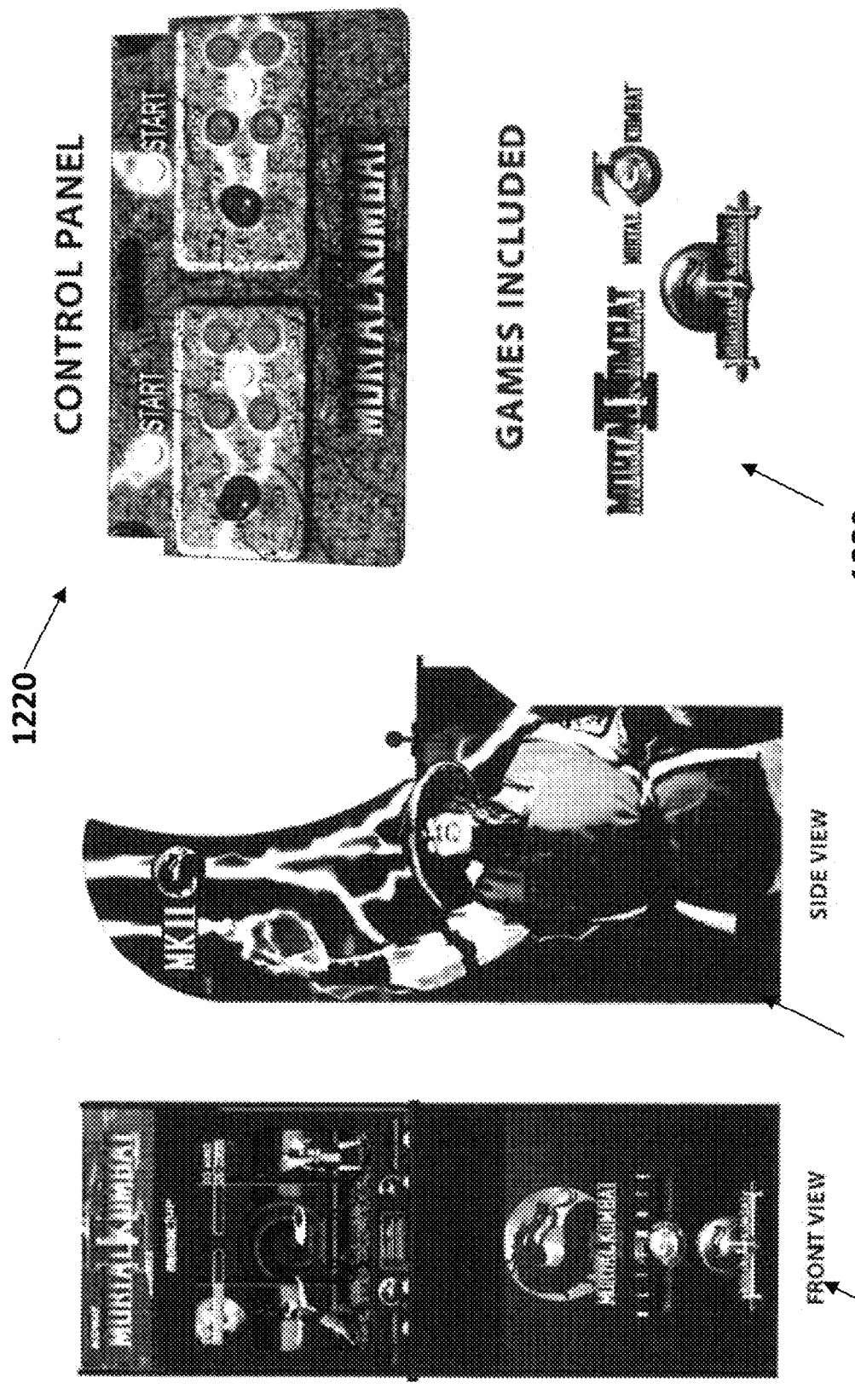
FIG. 12 illustrates a front view, side view, controller view and included games view for an example gaming system of the arcade system of FIG. 1.

FIG. 12 illustrates a front view 1200, side view 1210, controller view 1220 and included games view 1230 for an example gaming system of the arcade system 100 of FIG. 1. In FIG. 12, there is the gaming system of Mortal Kombat. As is illustrated in FIG. 12, the arcade system 100 is decorated as if Mortal Kombat as if it is the arcade cabinet of Mortal Kombat. This includes the sides of the unit 1, 19, above the display portion 4 of the unit and below the controller portion 11 of the unit. The front view 1200 illustrates additional games below the console that are included in the game system. Further details of additional games are illustrated in games view 1230 depicting Spy Hunter, Paperboy, and RootBeer Tapper along with Mortal Kombat.

The game system 100 includes the original cabinet art of the main game Mortal Kombat, provides authentic gameplay for each of the four included games and provides a classic two-player joystick. For example, control panel 1220 provides for control of the fighter using the joystick for jumping, flipping, moving, ducking, and buttons for high kick, high punch, low kick, low punch, and blocking. There is also a one-player and two-player game mode.

Figure 13:
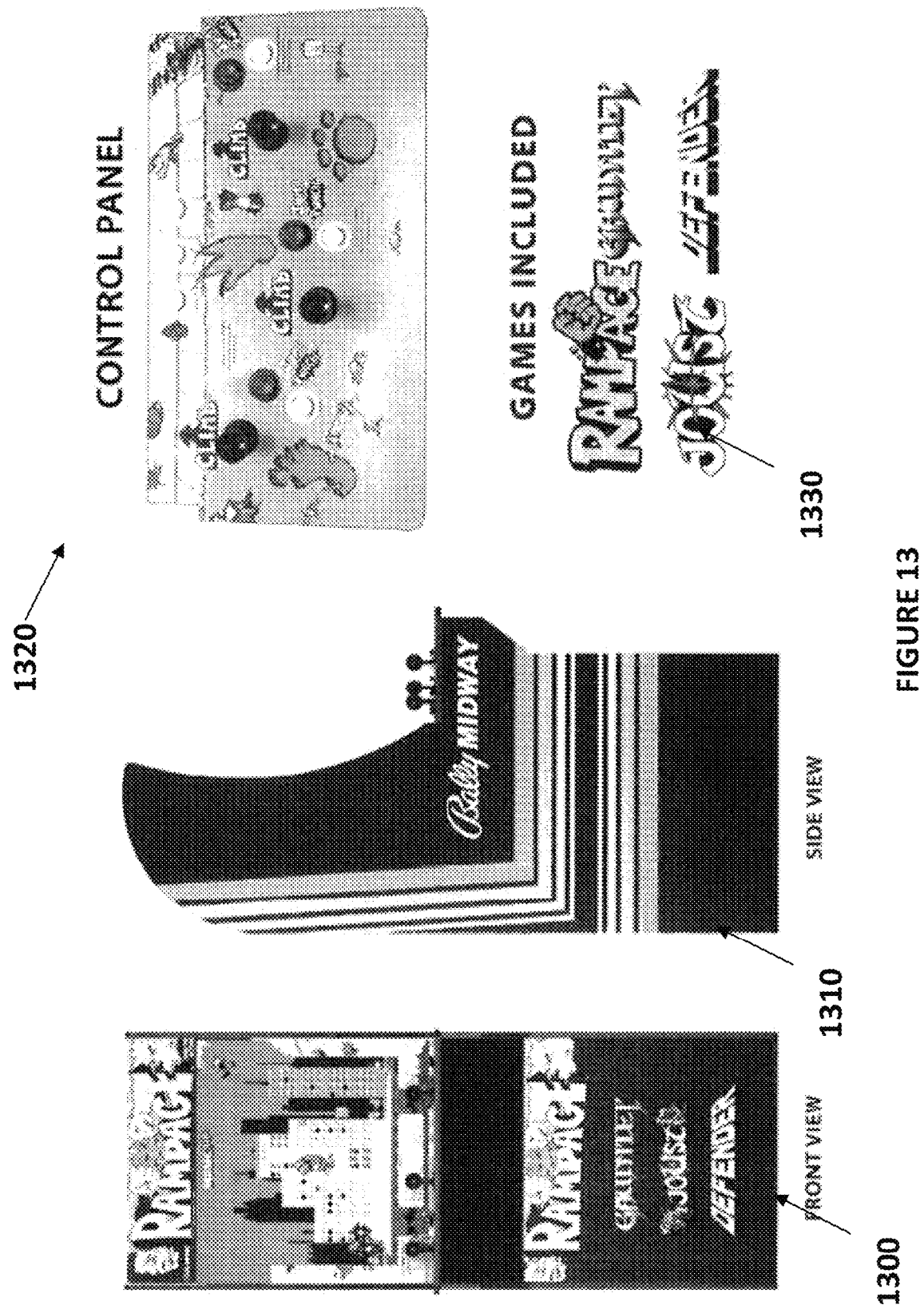
FIG. 13 illustrates a front view, side view, controller view and included games view for an example gaming system of the arcade system of FIG. 1.

FIG. 13 illustrates a front view 1300, side view 1310, controller view 1320 and included games view 1330 for an example gaming system of the arcade system 100 of FIG. 1. In FIG. 13, there is the gaming system of Rampage. As is illustrated in FIG. 13, the arcade system 100 is decorated as if Rampage as if it is the arcade cabinet of Rampage. This includes the sides of the unit 1, 19, above the display portion 4 of the unit and below the controller portion 11 of the unit. The front view 1300 illustrates additional games below the console that are included in the game system. Further details of additional games are illustrated in games view 1330 depicting Gauntlet, Joust, and Defender along with Rampage.

The game system 100 includes the original cabinet art of the main game Rampage, provides authentic gameplay for each of the four included games and provides a classic 3-player joystick. For example, control panel 1320 provides for control of the gorilla by climbing, jumping and punching by use of a set of buttons. There is also a one-player, two-player, and three-player game mode.

Figure 14:
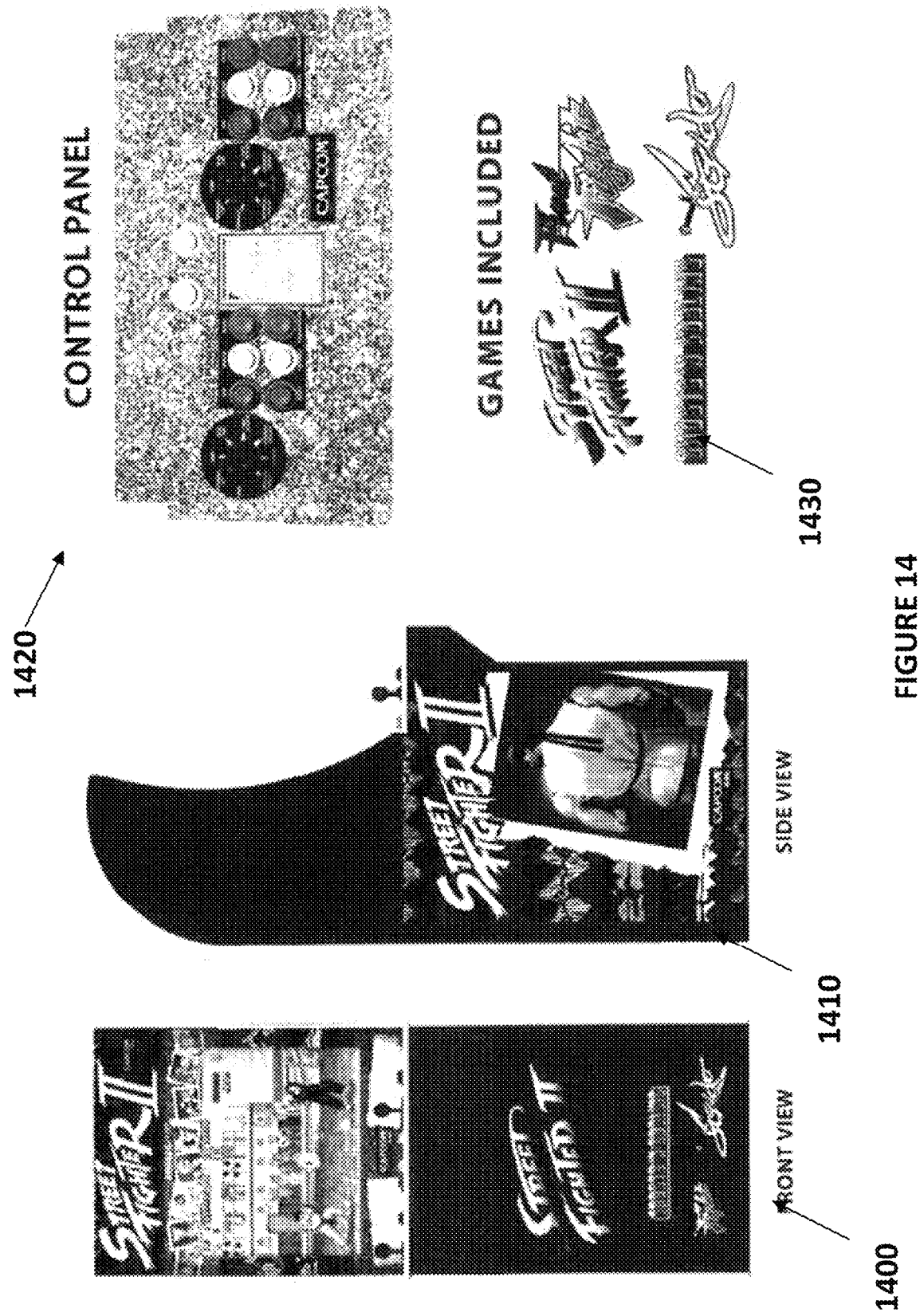
FIG. 14 illustrates a front view, side view, controller view and included games view for an example gaming system of the arcade system of FIG. 1.

FIG. 14 illustrates a front view 1400, side view 1410, controller view 1420 and included games view 1430 for an example gaming system of the arcade system 100 of FIG. 1. In FIG. 14, there is the gaming system of Street Fighter II. As is illustrated in FIG. 14, the arcade system 100 is decorated as the arcade cabinet of Street Fighter II. This includes the sides of the unit, 1, 19 above the display portion 4 of the unit and below the controller portion 11 of the unit. The front view 1400 illustrates additional games below the console that are included in the game system. Further details of additional games as illustrated in games view (E) depicting Final Fights, Ghosts N Goblins, and Strider along with Street Fighter II.

The game system 100 includes the original cabinet art of the main game Street Fighter II, provides authentic gameplay for each of the four included games and provides a classic two-player joystick. For example, control panel 1420 provides for control of the fighter by movement, and buttons for punching and kicking. There is also a one-player and two-player game mode.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

The invention claimed is:

1. A home arcade system purchased while requiring assembly at home, the system comprising:
    an outer portion of the arcade system formed from assembly of a left-side panel, a right-side panel, a back panel, a front panel, and a top panel;
    a screen display configured to display the arcade game to at least one user, the screen assembled with the outer portion;
    a controller panel assembled to the outer portion allowing the at least one user to interact with the arcade game using controls affixed thereto while viewing the screen display; and
    electronics necessary to provide the game screen of the arcade game on the screen display and to interact with the at least one user within the controls on the controller panel, wherein the arcade system includes a first arcade game and additional games, the controls on the controller panel providing appropriate input for the first arcade game and additional games.

2. The system of claim 1, wherein ones of the panels include art work for the first arcade game.

3. The system of claim 1, further comprising a wheel assembly.

4. The system of claim 1, wherein the screen display comprises a nineteen-inch LED display.

5. The system of claim 1, further comprising a screen frame configured to provide protection to the screen display.

6. The system of claim 1, further comprising a window frame to add finishing to the area around the display.

7. The system of claim 1, wherein the controller panel is designed to hold at least one of the printed circuit board (PCB), joysticks, buttons and controllers for the games.

8. The system of claim 1, wherein the screen display is connected via a video wire.

9. The system of claim 1, further comprising additional electronics to be connected.

10. The system of claim 9, wherein the additional electronics include a power supply.

11. The system of claim 9, wherein the additional electronics include a plurality of wire jacks.

12. The system of claim 1, further comprising a system attached to at least a portion of the outer portion configured to provide additional support to ones of the panels forming the outer portion.

13. The system of claim 12, wherein the system includes a front support, a back support and a base support configured to provide additional rigidity to the arcade system when assembled.

14. The system of claim 1, wherein the system includes a left bracket and right bracket configured to provide additional rigidity to the arcade system when assembled.

15. The system of claim 1, further comprising a system attached to at least a portion of the outer portion configured to provide additional mechanisms to attach ones of the panels in forming the outer portion.

16. A method for assembling a purchased home arcade system, said method comprising:
    interconnecting an outer portion of the arcade system formed from assembly of a left-side panel, a right-side panel, a back panel, a front panel, and a top panel;
    interconnecting a screen display configured to display the arcade game to at least one user, the screen assembled with the outer portion;
    assembling a controller panel with the outer portion allowing the at least one user to interact with the arcade game using controls affixed thereto while viewing the screen display; and
    electrically connecting electronics necessary to provide the game screen of the arcade game on the screen display and to interact with the at least one user within the controls on the controller panel, wherein the arcade system includes a first arcade game and additional games, the controls on the controller panel providing appropriate input for the first arcade game and additional games.

17. The method of claim 16, further comprising:
    electrically connecting the controller using a wire jack;
    electrically connecting the screen and electronics module using the other end of a wire jack distal to the controller and power to the electronics module;
    electrically connecting power connections through the back panel; and
    electrically connecting an A/C module to provide electrical connection.

18. The method of claim 16, further comprising attaching a wheel assembly to the outer portion.

19. The method of claim 16, further comprising assembling an additional support to at least a portion of the outer portion configured to provide additional support to ones of the panels forming the outer portion.

20. The method of claim 19, wherein the additional support includes a front support, a back support and a base support configured to provide additional rigidity to the arcade system when assembled.

21. The method of claim 19, wherein the additional support includes a left bracket and right bracket configured to provide additional rigidity to the arcade system when assembled.

* * * * *